US011227068B2

(12) United States Patent
Parthasarathy

(10) Patent No.: US 11,227,068 B2
(45) Date of Patent: Jan. 18, 2022

(54) SYSTEM AND METHOD FOR SENSITIVE DATA RETIREMENT

(71) Applicant: MENTIS INC, New York, NY (US)

(72) Inventor: Rajesh Krishnaswami Parthasarathy, Hudson, NY (US)

(73) Assignee: MENTIS INC, New York, NY (US)

( * ) Notice: Subject to any disclaimer, the term of this patent is extended or adjusted under 35 U.S.C. 154(b) by 0 days.

(21) Appl. No.: 17/207,641

(22) Filed: Mar. 20, 2021

(65) Prior Publication Data
US 2021/0209251 A1 Jul. 8, 2021

Related U.S. Application Data

(63) Continuation-in-part of application No. 16/656,341, filed on Oct. 17, 2019.

(51) Int. Cl.
*G06F 21/62* (2013.01)
*G06F 21/64* (2013.01)
*G06F 21/60* (2013.01)

(52) U.S. Cl.
CPC ........ *G06F 21/6254* (2013.01); *G06F 21/602* (2013.01); *G06F 21/64* (2013.01); *G06F 2221/2141* (2013.01); *G06F 2221/2143* (2013.01)

(58) Field of Classification Search
CPC .... G06F 21/6254; G06F 21/602; G06F 21/64; G06F 2221/2141; G06F 2221/2143; G06F 21/6245; H04L 63/10; H04L 2463/102; H04W 12/068; H04W 12/082
See application file for complete search history.

(56) References Cited

U.S. PATENT DOCUMENTS

| 9,477,825 | B1* | 10/2016 | Sinchak | H04L 63/107 |
| 9,866,561 | B2* | 1/2018 | Psenka | H04L 63/10 |
| 9,979,550 | B1* | 5/2018 | Fiedler | H04L 9/14 |

(Continued)

OTHER PUBLICATIONS

Liang et al., "Secureweb: Protecting sensitive information through the web browser extension with a security token," Shuang Liang;Yue Zhang;Bo Li;Xiaojie Guo;Chunfu Jia;Zheli Liu Tsinghua Science and Technology.*

(Continued)

*Primary Examiner* — Roderick Tolentino
(74) *Attorney, Agent, or Firm* — Barry Choobin; Patent 360LLC

(57) ABSTRACT

A system including a data retirement engine (DRE) and a method are provided for retiring sensitive data. The DRE receives a sensitive data map generated by a sensitive data discovery engine (SDDE) integrated to the DRE. The sensitive data map includes locations of sensitive data of different data types in multiple data stores. The DRE generates tokens for operational data from the sensitive data map based on selectable data classifications using one or more tokenizers that desensitize the sensitive data, while retaining transactional data. The DRE determines candidates from the operational data in an entirety of a target data store for the tokenization based on rules adjustably configured based on predetermined criteria. The DRE tokenizes the candidates using the tokens on the target data store and facilitates detokenization using a soft delete mode and deletion of the tokens using a hard delete mode.

12 Claims, 31 Drawing Sheets

(56) References Cited

U.S. PATENT DOCUMENTS

| | | | | |
|---|---|---|---|---|
| 2012/0173563 | A1* | 7/2012 | Griffin | G06F 21/6245 |
| | | | | 707/769 |
| 2016/0253686 | A1* | 9/2016 | Roberts | G06Q 30/0201 |
| | | | | 705/7.32 |
| 2017/0213174 | A1* | 7/2017 | Deshpande | G06Q 10/0633 |
| 2018/0063182 | A1* | 3/2018 | Jones | H04L 63/1433 |
| 2018/0332016 | A1* | 11/2018 | Pandey | H04L 63/108 |
| 2019/0050558 | A1* | 2/2019 | LeMay | G06F 21/53 |
| 2019/0342088 | A1* | 11/2019 | Eidson | H04L 9/14 |
| 2019/0392423 | A1* | 12/2019 | Agarwal | G06Q 20/326 |

OTHER PUBLICATIONS

Jain, Sunil Dilip "Enhancing security in Tokenization using NGE for storage as a service," 2017 1st International Conference on Intelligent Systems and Information Management (ICISIM) Year: 2017 | Conference Paper | Publisher: IEEE.*

* cited by examiner

| Method | Format Preservation | Uniqueness | Repeatability | Consistency | Reversibility | AES | SHA | Performance (Computational complexity) | Vault (Mapping Table) | Key Management |
|---|---|---|---|---|---|---|---|---|---|---|
| T1 | ✓ | ✓ | ✓ | ✓ | ✓ | ✓ | ✗ | High | ✓ | ✗ |
| T2 | ✓ | ✓ | ✓ | ✓ | ✓ | ✗ | ✓ | High | ✓ | ✗ |
| T3 | ✗ | ✗ | ✓ | ✓ | ✓ | ✗ | ✗ | Medium | ✓ | ✗ |
| T4 | ✓ | ✓ | ✓ | ✓ | ✗ | ✗ | ✓ | High | ✗ | ✗ |
| T5 | ✗ | ✓ | ✗ | ✓ | ✗ | ✗ | ✓ | High | ✗ | ✗ |
| T6 | ✗ | ✗ | ✓ | ✗ | ✗ | ✗ | ✗ | Medium | ✗ | ✗ |
| T7 | ✗ | ✗ | ✗ | ✓ | ✗ | ✗ | ✗ | Medium | ✗ | ✗ |
| T8 | ✓ | ✓ | ✓ | ✓ | ✓ | ✓ | ✗ | High | ✗ | ✓ |

FIG. 10

| Original Data | | | | |
|---|---|---|---|---|
| CRITERIA FOR DISPOSAL: END DATE EARLIER THAN 2011 | | | | |
| PERSON_ID | FIRST_NAME | LAST_NAME | NATIONAL_ID | EFFECTIVE_END_DATE |
| 21 | Carl | Douglas | 342-34-9847 | 27-08-2014 |
| 32 | Jamie | Frost | 901-66-8761 | 14-05-2015 |
| 33 | Kerry | Jones | 654-33-6511 | 12-06-2001 |
| 53 | Amy | Marlin | 253-46-8027 | 17-01-1999 |
| 98 | Howard | Sprague | 675-09-7876 | 10-01-1996 |
| 129 | Ellen | Palm | 149-23-2333 | 28-02-2016 |
| 137 | Art | Vandelay | 876-98-0451 | 14-03-2010 |
| 143 | Raymond | Welch | 144-56-3321 | 30-06-1995 |

FIG. 11A

| Retired Data | | | | |
|---|---|---|---|---|
| PERSON_ID | FIRST_NAME | LAST_NAME | NATIONAL_ID | EFFECTIVE_END_DATE |
| 21 | Carl | Douglas | 342-34-9847 | 27-08-2014 |
| 32 | Jamie | Frost | 901-66-8761 | 14-05-2015 |
| 33 | Kerry | Jones | N00000000000000009532 | 12-06-2001 |
| 53 | Amy | Marlin | N00000000000000000880 | 17-01-1999 |
| 98 | Howard | Sprague | N00000000000000008440 | 10-01-1996 |
| 129 | Ellen | Palm | 149-23-2333 | 28-02-2016 |
| 137 | Art | Vandelay | N00000000000000003687 | 14-03-2010 |
| 143 | Raymond | Welch | N00000000000000001499 | 30-06-1995 |

FIG. 11B

| Original Data | PERSON_ID | First Name | Last Name | Email Address | Social Security Number | Bank Account |
|---|---|---|---|---|---|---|
| | 4223 | James | Smith | James.Smith@localhost.com | 149-13-7317 | 165739829 |
| | 1245 | John | Taylor | John.Taylor@localhost.com | 909-03-4642 | 9098222349474 |
| | 6422 | Linda | Walker | Linda.Walker@localhost.com | 778-62-8144 | 6777825 |

FIG. 12A

| Tokenized Data | PERSON_ID | First Name | Last Name | Email Address | Social Security Number | Bank Account |
|---|---|---|---|---|---|---|
| | 4223 | J~23 | S~0012 | J~1234563@iretire.com | 000-15-1234 | 600000023 |
| | 1245 | J~09 | T12345 | J~92459864@iretire.com | 000-00-0123 | 500000124241 |
| | 6422 | L~123 | W78754 | L~5432653@iretire.com | 000-12-0021 | 4000123 |

FIG. 12B

| Reversed Data for 1245 | PERSON_ID | First Name | Last Name | Email Address | Social Security Number | Bank Account |
|---|---|---|---|---|---|---|
| | 4223 | J~23 | S~0012 | J~1234563@iretire.com | 000-15-1234 | 600000023 |
| | 1245 | John | Taylor | John.Taylor@localhost.com | 909-03-4642 | 9098222349474 |
| | 6422 | L~123 | W78754 | L~5432653@iretire.com | 000-12-0021 | 4000123 |

FIG. 12C

| IRET_CAND_ID | DC_ID | MT_ID | MCL_ID | MCL_VALUE | CONN_MCL_VALUE | IRET_CAND_DATA_ID | TOKEN |
|---|---|---|---|---|---|---|---|
| 200 | 1 | 190171 | 2084085 | 909-03-4642 | 1245 | 240 | 000-00-0123 |
| 200 | 1 | 11000002 | 11000315 | 909-03-4642 | 1245 | 240 | 000-00-0123 |
| 225 | 4 | 174381 | 2841957 | John | 1245 | 323 | J~09 |
| 225 | 4 | 190171 | 2084084 | John | 1245 | 323 | J~09 |
| 225 | 48 | 174381 | 2841959 | Taylor | 1245 | 327 | T12345 |
| 225 | 48 | 190171 | 2084078 | Taylor | 1245 | 327 | T12345 |
| 180 | 1 | 190171 | 2084085 | 149-13-7317 | 4223 | 220 | 000-15-1234 |
| 224 | 4 | 174381 | 2841957 | James | 4223 | 324 | J~23 |
| 224 | 4 | 190171 | 2084084 | James | 4223 | 324 | J~23 |
| 224 | 48 | 174381 | 2841959 | Smith | 4223 | 328 | S~0012 |
| 224 | 48 | 190171 | 2084078 | Smith | 4223 | 328 | S~0012 |
| 214 | 1 | 190171 | 2084085 | 778-62-8144 | 6422 | 277 | 000-12-0021 |
| 223 | 4 | 190171 | 2084084 | Linda | 6422 | 325 | L~123 |

FIG. 13

DATA CLASSIFICATIONS

Available

6. Credit Card information
7. Date of Birth
8. Email Addresses
9. First Name
10. Full Name
11. General Ledger

Selected

1. Bank Account
2. Address

— 1502

| Field | Option |
|---|---|
| Discovery Type | ◎ Agent based discovery  ◉ Engine based discovery |
| Scanning size | ◉ Run for full data  ◎ Run for sample (sample size defined in instance parameters. E.g. 1000 rows) |
| Refresh Discovery Results | ◎ Keep all results  ◉ Refresh complex columns only  ◉ Refresh all results |
| Reuse Discovery Indexes | ☐ Reuse pattern index  ☐ Reuse repository index |
| Zero Row Tables | ☐ Exclude zero row tables from discovery |

DATA CLASSIFICATIONS — 1504

| Available | Include? |
|---|---|
| 1 National Identifier | ☐ |
| 2 Bank Account | ☐ |
| 3 First Name | ☐ |
| 4 Last Name | ☐ |
| 5 Full Name | ☐ |

FIG. 15D

WELCOME : MENTIS

ENTITIES
- Retire Employees
- Bank account testing
- People Soft

DETAILS

Entity Name : Employees

Description : Retire Employees

1505

FILTERS

Application: All Applications

Search

Sort

Entity Name

| Driver Columns | | Token Columns | |
|---|---|---|---|
| 5 | | 5 | |
| N/A | N/A | N/A | N/A |
| Created By | Creation Date | Last Updated By | Last Update Date |

FIG. 15E

DRIVER COLUMNS

1506

| Owner | Table | Column | Type | Selector SQL |
|---|---|---|---|---|
| 1. HR | PER_ALL_PEOPLE_F | PERSON_ID | Connection | |
| 2. HR | PER_ALL_PEOPLE_F | EFFECTIVE_END_DATE | Driver | select max (effective_end_date) from HR.PER_ALL_PEOPLE_F@ <<Link_NAME >> b where b. PERSON ID=A.PERSON_ID AND EFFECTIVE_END_DATE <sysdate group by B.Person_ID |
| 3. HR | PER_ALL_PEOPLE_F | FULL_NAME | Information | |
| 4. HR | PER_ALL_PEOPLE_F | DATE_OF_BIRTH | Information | |

FIG. 15F

WELCOME : MENTIS

PICK DATA CLASSIFICATIONS TO INCLUDE

| Entity Name | Data Classifications | Include? |
|---|---|---|
| *3 EMPLOYEES | Bank Account | > |
| *4 EMPLOYEES | First Name | > |
| *5 EMPLOYEES | Last Name | > |
| *6 EMPLOYEES | Full Name | > |

WELCOME : MENTIS

ACTIONS

Enter Number of Days

Archive after [ 1 ]

Remove after [ 1000 ]

Do not archive/remove current year data? [✓]

FIG. 15L

Results (Summary)

1 — Number of Candidates

12 — Total Rows affected

1513

Results (Detail)

| PERSON_ID | EFFECTIVE_END_DATE | EMPLOYEE_NUMBER | FULL_NAME | DATE_OF_BIRTH |
|---|---|---|---|---|
| 5224 | 2003-07-17 00:00:00.0 | 45 | Becker, Oliver | 05-SEP-67 |

| Back | Freeze | Execute | Do not save | Done | Download |
|---|---|---|---|---|---|

Messages

FIG. 15M

Results (Summary)

1  
Number of Candidates

12  
Total Rows affected

Results (Detail)

| PERSON_ID | EFFECTIVE_END_DATE | EMPLOYEE_NUMBER | FULL_NAME | DATE_OF_BIRTH |
|---|---|---|---|---|
| 5224 | 2003-07-17 00:00:00.0 | 45 | Becker, Oliver | 05-SEP-67 |

| Back | Freeze | Execute | Do not save | Done | Download |

Messages  
The rule has been successfully frozen.

| PSFT : Rule | DETAILS | Records effected for last 12 executions | ▼ FILTERS |
|---|---|---|---|
| Sal | | | Entity |
| Sal Complex Rule | Rule Description: Complex Rule Setup | 1514 | All Entities > |
| VIS: Bank Account | Entity Name: Employees | | Instance |
| VIS: Complex Rule | Instance: VIS | | All Instances > |
| VIS: Incremental | Archive after: 1 | | Rules |
| VIS: Without Bank Account | ☑ Retain Current Flag | | All Rules > |
| VIS_RULE | Remove After: 100 | | ↕ SORT |
| | CONDITIONS | CLASSIFICATIONS | Rule Name Ascending > |
| | person_id in (select value from ment_repos where type='IRETIRE_PERSON_I D' and attribute2='Y') and person_id not in (select value from ment_repos where type='IRETIRE_EXCLUSIO N_LIST' and attribute2='Y') | Bank Account | |
| | | First Name | |
| | | Full Name | |
| | | Last Name | |
| | | ⚙ ⌐REPORT¬ 1514a | |
| | EXECUTIONS | | |
| | Name | Date | Status | Records Affected |
| | REVERSE_RETIRE | 24-Aug-2020 18:49:08 | C | 0 |
| | REVERSE_RETIRE | 24-Aug-2020 18:48:32 | C | 0 |
| | VIS: Complex Rule | 24-Aug-2020 18:44:37 | C | 0 |

FIG. 15O

SYSTEM AND METHOD FOR SENSITIVE DATA RETIREMENT

CROSS-REFERENCE TO RELATED APPLICATIONS

This application is a continuation-in-part application of the non-provisional patent application titled "Integrated System and Method for Sensitive Data Security", application Ser. No. 16/656,341, filed in the United States Patent and Trademark Office (USPTO) on Oct. 17, 2019, which claims priority to and the benefit of the provisional patent application titled "An Integrated System and Method for Sensitive Data Security", application No. 62/719,604, filed in the USPTO on Aug. 17, 2018 and the non-provisional patent application titled "System and Method for Data Classification Centric Sensitive Data Discovery", application Ser. No. 16/541,589, filed in the USPTO on Aug. 15, 2019. The specifications of the above referenced patent applications are incorporated herein by reference in their entirety.

BACKGROUND

Technical Field

The embodiments herein, in general, relate to data security. More particularly, the embodiments herein relate to a system and a method for retiring sensitive data across multiple similar and variant data stores.

Description of the Related Art

Large enterprises store a massive volume of both structured and unstructured data including sensitive data used for software applications. This massive volume of data is difficult for most enterprises to process using conventional database and software techniques. Sensitive data is present at arty location, for example, relational databases, hierarchical databases, server applications, file systems, text, documents, external files, complex data locations, composite data locations, unvalidated fields, binary large objects (BLOBs), character large objects (CLOBs), key value pairs, temporary tables such as phantom tables created by a database, structured data sources, unstructured data sources, mainframes, cloud data sources, big data sources, etc. Sensitive data such as personal identification information, financial information, healthcare information, etc., contains information that causes security issues to individuals and enterprises, when compromised. As most enterprises operate in a cloud computing environment and as volume of big data increases, most enterprises lose track of the locations of the sensitive data and hence find difficulty in taking appropriate measures to protect the sensitive data.

Several organizations such as banking, insurance, telecom, and healthcare organizations maintain thousands of sensitive applications that are exposed to thousands of end users, partners, clients, etc., daily. With the sensitive data being exploited by malicious hackers that steal user identities, the organizations need to detect and protect sensitive data. In addition to identifying sensitive data and the locations of the sensitive data, there is a need for determining and/or selecting the users and programs that have access to and that have accessed the sensitive data. Identifying sensitive data is a challenge for several reasons. Within an enterprise network, multiple databases store a massive number of data records that are incessantly modified, added, and deleted. Moreover, a database administrator or a functional expert does not have the functional knowledge and time to analyze every database in the enterprise network. Furthermore, the data sources in large enterprises are highly complex, thereby requiring enormous human effort to discover locations of the sensitive data. As the locations of the sensitive data are unknown, operations such as classifying, anonymizing, monitoring, and detecting suspicious exfiltration events, and security of the data, become difficult tasks.

To avoid data breaches during an access of applications and databases, there is a need for protecting sensitive data in the underlying databases. The scope of data security has expanded from on-premise to the cloud. Moreover, compliance to data security regulations such as the General Data Protection Regulation (GDPR) and cross border production support, business operations demand a need for securing data. To protect the sensitive data, there is a need for identifying all the sensitive data present in a database and the locations of the sensitive data. Conventional discovery methods are not scalable across data sources and applications. The conventional methods of discovering sensitive data comprise pattern matching, dictionary matching, regular expressions, etc. Other conventional methods identify sensitive data based on classification rules that are set by using a conventional pattern matching approach, or solely by a dictionary matching approach. The conventional methods for identifying the locations of the sensitive, data have numerous challenges. Identifying sensitive data in a database solely by conventional data dictionary-based methods are not reliable as these methods fail to identify most of the real sensitive data. For example, a dictionary match process typically identities only a third of sensitive data and their locations.

A combination of pattern matching and regular expressions is also not adequate to reduce false positives to a practicable level. For example, usage of regular expressions and pattern matching results in more than 75% false positives. Moreover, regular expression (regex) and pattern-based searches are unable to find sensitive data in complex columns, composite columns, BLOBs, CLOBs, key value pairs phantom tables, etc. Moreover the conventional methods do not identify reasons and attributes for classifying sensitive data. Furthermore, the conventional methods are unable to distinguish data classifications with the same patterns as they are not data classification centric. While some conventional methods are configured to identify the sensitive data locations only, these methods do not generate metadata comprising information of the users and programs that have access to the sensitive data. Furthermore, the conventional discovery mechanisms typically do not have a common metadata of the sensitive data across disparate databases across the enterprise. The results obtained through these discovery mechanisms, therefore, are not effectively used in downstream data masking, data monitoring, etc. The conventional discovery solutions also lack the ability to consistently discover sensitive data located across data sources and across applications. Typically, the underlying database of any application is updated periodically, due to which, the sensitive data discovery process is typically performed using the conventional methods for the entire database again along with old and new data, which is time consuming and inefficient.

One of the downstream sensitive data security operations comprises data retirement. Data retention policies within an organization comprise a set of guidelines that describe what data will be retained, how long the data will be stored, and what happens to the data at the end of a retention period. Conventional solutions for data disposal comprise archiving data records and deleting data records comprising user requested data or data obsolete as per policy. Archival of data records comprising, for example, historical transactional data, moves all inactive records from production systems to other locations. Archival of data records does not eliminate the risk, but merely transfers or transports the risk from one location to another. Moreover, archival of data records only disposes off the transactional data, whereas most of the sensitive data is present in the operational data. Furthermore, legislations do not recognize archival of data records as an adequate method of protecting inactive sensitive data. Conventional archival solutions are not flexible to address differences in data retention rules based on geographies and types of data. The other method for data disposal comprises deleting data records that are past the retention period through conventional delete operations that preclude recovery of the deleted data records. Conventional delete operations are typically not used for large volume production data. Historical transactional data records are typically archived or moved from production systems to other locations. Deletion of data records results in loss of referential integrity due to which application integrations face challenges. Deletion involves removal of all data records, thereby affecting the transactional integrity of a data store.

There are various other challenges with the adoption of data deletion and data archival, for example, complexity in application architectures, difference in data sources such as the Oracle® database of Oracle International Corporation versus the Microsoft® structured query language (SQL) server, etc., different data retention rules for different types of data, different geographies, ability to support architectural changes during data disposal, etc. One of the challenges with data deletion and data archival is the disposal of transactional data as most of the sensitive data is present in operational data. Transactional data comprises data that describes business events of an organization, whereas operational data comprises data that is used for managing technology and information assets of the organization. Data deletion and data archival require an accurate determination of all locations of the sensitive data to preclude risks. Data deletion and data archival also lead to inconsistent history, which adversely affects data analytics. Moreover, there is high likelihood that application integrity is compromised if the deletion and the archival are not complete. Furthermore, evaluating whether deletion rules and archival rules will still work after an upgrade or a patch is applied at a data source is time intensive. There is a need for user-requested and/or policy-driven inactive sensitive data retirement, also referred to as "sensitive data minimization".

Conventional data security systems are neither comprehensive nor integrated to enable discovery, anonymization, monitoring, and retirement of sensitive data across various data sources and applications. Some conventional solutions provide separate, discrete, standalone products for each sensitive data security operation, namely, sensitive data discovery, data anonymization, data monitoring, and data retirement, and these separate standalone products are not integrated with each other. Other conventional solutions provide standalone products for data security that are loosely integrated with each other. This loose integration typically involves externalized loading of result datasets in related products. Some conventional solutions provide partially integrated, limited combinations of data protection tools or modules for data security needs which render them inefficient and incomplete. For example, some systems provide solutions that cover discovery and masking of sensitive data only, while others provide discovery and encryption of sensitive data only, while some others provide anonymization and monitoring of sensitive data only. These conventional solutions do not integrate products that protect sensitive data across its lifecycle, which is required for consistent anonymization, data retirement, and complete security of the sensitive data. Moreover, the metadata or intelligence of one data protection module is not shared or used by other data protection modules for downstream sensitive data security operations, for example, data masking, data monitoring, data retirement, etc., due to a lack of integration.

Hence, there is a long-felt need for a system and a method for integrating sensitive data discovery with data retirement for comprehensively discovering inactive sensitive data across multiple similar and variant data stores and retiring the discovered sensitive data, while addressing the above-recited problems associated with the related art. Furthermore, there is a need for a system and a method for retiring the sensitive data by tokenizing the discovered sensitive data using, an array of tokenizers that desensitizes the sensitive data, while retaining the transactional data.

OBJECTS OF THE EMBODIMENTS HEREIN

An object of the embodiments herein is to provide an integrated system and a method for integrating and managing security of sensitive data from discovery to retirement across a lifecycle of the sensitive data.

Another object of the embodiments herein is to provide an integrated platform for discovering, anonymizing, pseudonymizing, monitoring, and retiring the sensitive data across multiple similar and variant data sources and applications in an integrated manner.

Yet another object of the embodiments herein is to provide a data classification centric method and a system for discovering sensitive data based on configurable and flexible data classifications, in source systems spanning a plurality of similar and variant data sources such as relational databases, hierarchical databases, structured data sources, unstructured data sources, cloud data sources, big data sources, file systems, text, documents, external files, mainframes, etc., data locations such as complex data locations, composite data locations, unvalidated fields, binary large objects (BLOBs), character large objects (CLOBs), key value pairs, temporary tables such as phantom tables created by a database, etc., and applications, with minimal false positives.

Yet another object of the embodiments herein is to provide a system and a method for scanning database tables, columns, rows, and application codes based on defined data classifications to provide results pertaining to locations and access of sensitive data.

Yet another object of the embodiments herein is to provide an integrated system and a method for sharing a common repository of metadata and discovery results comprising location and access to the sensitive data by inspecting application codes that are used for downstream data security operations such as data masking, data encryption, data monitoring, data mapping, data tokenization, data retirement, etc., wherein the metadata or intelligence of one data protection module in the integrated system is shared or used by other data protection modules by integration.

Yet another object of the embodiments herein is to provide an integrated system and a method for venerating sensitive data discovery intelligence comprising metadata, results of the determination of the sensitive data, locations of the determined sensitive data, and information of users and programs that access the determined sensitive data by inspecting the identified application codes.

Yet another object of the embodiments herein is to provide an integrated system and a method for generating one or more templates comprising the sensitive data discovery intelligence and data security rules for managing the security of the determined sensitive data across the lifecycle of the determined sensitive data.

Yet another object of the embodiments herein is to provide an integrated system and a method for securing the determined sensitive data across the lifecycle of the sensitive data in a pre-production environment, a production environment, and a non-production environment.

Yet another object of the embodiments herein is to provide an integrated system and a method for a template comprising the sensitive data discovery intelligence, for storing the generated sensitive data discovery intelligence at a single location of the integrated platform, and for generating one or more templates that are configured for an extended use in subsequent or downstream data security operations such as data masking, data encryption, data monitoring, data mapping, data tokenization, data retirement, etc.

Yet another object of the embodiments herein is to provide a system and a method for securely retiring inactive sensitive data and for integrating data retirement with sensitive data discovery by using the metadata generated and shared from the discovery of sensitive data, to ensure that all the locations of the sensitive data are identified and the risk is minimized.

Yet another object of the embodiments herein is to provide a system and a method for generating a sensitive data map comprising locations of sensitive data of a plurality of data types in each of a plurality of data stores.

Yet another object of the embodiments herein is to provide a system and a method for generating tokens for operational data contained in the sensitive data from the sensitive data map based on selectable data classifications of the operational data using one or more of a plurality of tokenizers configured to desensitize the sensitive data, while retaining transactional data.

Yet another object of the embodiments herein is to provide a system and a method for adjustably configuring rules for executing tokenization of the operational data based on predetermined criteria.

Yet another object of the embodiments herein is to provide a system and a method for facilitating deletion of the tokens in different modes comprising, for example, a soft delete mode and a hard delete mode.

The objects disclosed above will be realized and achieved at least by the elements features, and combinations particularly pointed out in the claims. The objects disclosed above have outlined, rather broadly, the features of the embodiments disclosed herein in order that the detailed description that follows is better understood. The objects disclosed above are not intended to determine the scope of the claimed subject matter and are not to be construed as limiting of the embodiments disclosed herein. Additional objects, features, and advantages of the embodiments disclosed herein are disclosed below. The objects disclosed above, which are believed to be characteristic of the embodiments disclosed herein, both as to its organization and method of operation, together with further objects, features, and advantages, will be better understood and illustrated by the technical features broadly embodied and described in the following description when considered in connection with the accompanying drawings.

SUMMARY

This summary is provided to introduce a selection of concepts in a simplified form that are further disclosed in the detailed description. This summary is not intended to determine the scope of the claimed subject matter.

The various embodiments herein provide an integrated system or an integrated platform and a method for integrating and managing security of sensitive data comprising inactive and user-requested sensitive data across a lifecycle of the sensitive data. According to an embodiment herein, the integrated platform comprises a sensitive data discovery engine, a data anonymization engine, a data monitoring module, and a data retirement engine that define computer program instructions executable by at least one processor in the integrated platform. The sensitive data discovery engine determines and identifies sensitive data by executing one or more of multiple match operations in a scanning pathway on data in each of multiple similar and variant data sources and applications for a selected one of multiple unique data classifications. According to an embodiment herein, the match operations comprise, a master data field match operation, multiple dictionary match operations, a code match operation, multiple pattern match operations, and multiple exact data match operations. According to an embodiment herein, the result of the match operations is a scorecard-based determination for deterministic sensitive data discovery. The similar and variant data sources comprise relational databases, hierarchical databases, file systems, text, documents, external files, complex data locations, composite data locations, unvalidated fields, binary large objects (BLOBS), character large objects (CLOBs), key value pairs, phantom tables, structured data sources, unstructured data sources, mainframes, cloud data sources, big data sources, etc.

The sensitive data discovery engine identifies the application codes that operate on the determined sensitive data. The sensitive data discovery engine generates sensitive data discovery intelligence comprising metadata, results of the determination of the sensitive data, locations of the determined sensitive data, and information of users and programs that access the determined sensitive data by inspecting the identified application codes. According to an embodiment herein, the sensitive data discovery intelligence further comprises historical data related to the identified sensitive data and relationships of the users with the sensitive data. According to an embodiment herein, the sensitive data discovery engine stores the sensitive data discovery intelligence in a single location of the integrated platform.

The sensitive data discovery engine receives and inserts data security rules into the sensitive data discovery intelligence to generate templates for managing the security of the determined sensitive data across the lifecycle of the identified sensitive data. That is, the sensitive data discovery engine generates one or more templates comprising the sensitive data discovery intelligence and the data security rules. The data security rules comprise configuration rules for anonymization monitoring, and retirement of the identified sensitive data. According to an embodiment herein, the configuration rules for the anonymization of the identified sensitive data comprise anonymization, authorization, and monitoring information of the users. According to an embodiment herein, the integrated platform configures the generated templates as one or more anonymization templates, one or more monitoring templates, and one or more retirement templates. Each of the anonymization templates, the monitoring templates, and the retirement templates comprises the generated sensitive data discovery intelligence and the data security rules.

According to an embodiment herein, the sensitive data discovery engine distributes the generated templates to the data anonymization engine, the data monitoring module, and the data retirement engine of the integrated platform deployed on each of the similar and variant data sources. According to an embodiment herein, the generated templates are configured to secure the determined sensitive data across the lifecycle of the determined sensitive data in a pre-production environment, a production environment, and a non-production environment. According to an embodiment herein, the integrated platform is an integrated engine that deploys agents on the similar and variant data sources and the applications for implementing the sensitive data discovery engine, the data anonymization module, the data monitoring module, and the data retirement engine locally at the similar and variant data sources and the applications. The generation of the templates combining the sensitive data discovery intelligence with the data security rules to the data anonymization engine, the data monitoring module, and the data retirement engine of the integrated platform deployed on each of the similar and variant data sources allows sharing or use of the metadata or intelligence of the sensitive data discovery engine by the data anonymization engine, the data monitoring module, and the data retirement engine in the integrated platform. According to an embodiment herein, the data anonymization engine flexibly and consistently anonymizes the identified sensitive data of multiple data types accessible by one or more of the applications using the templates based on an architecture of each of the applications. According to an embodiment herein, the data anonymization engine flexibly and consistently performs integrated anonymization on the determined sensitive data of multiple data types accessible by one or more of the applications using the generated templates based on the selected unique data classification and a nature of an application environment, for example, a pre-production environment, a production environment, and anon-production environment. According to an embodiment herein, the data monitoring module continuously monitors an access of the identified sensitive data by users and the programs using the generated templates.

According to an embodiment herein, the data retirement engine determines and retires inactive sensitive data from the identified sensitive data without removing transactional data therefrom using the generated templates. The data retirement engine performs user-requested and/or policy-driven inactive sensitive data retirement, also referred to as "sensitive data minimization". The data retirement engine is integrated to and in operable communication with the sensitive data discovery engine. The data retirement engine receives a sensitive data map generated by the sensitive data discovery engine. The sensitive data map comprises locations of sensitive data of a plurality of data types in each of a plurality of data stores. The data stores comprise, for example, relational databases, hierarchical databases, server applications, file systems, text, documents, external files, complex data locations, composite data locations, unvalidated fields, BLOBS, CLOBs, key value pairs, phantom tables, structured data sources, unstructured data sources, mainframes, cloud data sources, and big data sources. The data retirement engine generates tokens for operational data contained in the sensitive data from the sensitive data map based on selectable data classifications of the operational data using one or more of a plurality of tokenizers configured to desensitize the sensitive data, while retaining transactional data.

The data retirement engine adjustably configures rules for executing tokenization of the operational data based on predetermined criteria. The predetermined criteria comprise, for example, one or more of the selectable data classifications and a retirement time period. According to an embodiment herein, the data retirement engine creates entities for grouping and tokenizing the operational data based on the adjustably configured rules. The data retirement engine determines candidates from the operational data in an entirety of a target data store for the tokenization based on the adjustably configured rules. The data retirement engine tokenizes the candidates using the generated tokens on the target data store. According to an embodiment herein, the data retirement engine tokenizes the candidates with a token mapping table by implementing at least one of: reversible cryptographic tokenization using an advanced encryption standard, reversible cryptographic tokenization using a secure hash algorithm, and reversible non-cryptographic tokenization. According to an embodiment herein, the data retirement engine encrypts and stores a mapping of the candidates and the generated tokens in the token mapping table on a token server. The token mapping table is configured to allow prospective retrieval of inactive sensitive data. According to another embodiment herein, the data retirement engine tokenizes the candidates without a token mapping table by implementing at least one of: irreversible cryptographic authenticatable tokenization irreversible cryptographic non-authenticatable tokenization, irreversible note cryptographic authenticatable tokenization, irreversible non-cryptographic non-authenticatable tokenization, and reversible cryptographic tokenization.

The data retirement engine facilitates deletion of tokens in different modes. The different modes for the deletion of tokens comprise, for example, a soft delete mode and a hard delete mode. The soft delete mode is configured to archive the token mapping table that stores mapping information associated with mapping of the candidates to the generated tokens. According to an embodiment herein, to execute the soft delete mode, the data retirement engine receives a list of the candidates for which the mapping information is to be archived using the adjustably configured rules: and transfers the mapping information of the candidates in the received list from the token mapping table to an archive table. In the soft delete mode, the mapping information is deleted from the token mapping table. Furthermore, in the soft delete mode, the data retirement engine transfers the archive table to a secure location, from where the archive table is retrievable in response to a request for the reversal of the tokenization. In response to the request for the reversal of the tokenization, the data retirement engine transfers the mapping information of the candidates in the received list from the archive table to the token mapping table for restoration. The hard delete mode is configured to permanently delete the token mapping table. According to an embodiment herein, to execute the hard delete mode, the data retirement engine receives a list of the candidates for which the mapping information is to be deleted using the adjustably configured rules; and permanently and irreversibly deletes the mapping information from the token mapping table.

In one or more embodiments, related systems comprise circuitry and/or programming for executing the methods disclosed herein. The circuitry and/or programming are of any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific components and methods disclosed herein. The description of a component or a method step referenced by a numeral in a drawing is applicable to the description of that component or method step shown by that same numeral in any subsequent drawing herein.

FIG. 10 exemplarily illustrates a table representation of characteristics of different tokenizers executed by the data retirement engine for tokenizing sensitive data, according to an embodiment herein.

FIGS. 11A-11B exemplarily illustrate tabular representations showing a retirement of sensitive data executed by the data retirement engine, according to an embodiment herein.

FIGS. 12A-12C exemplarily illustrate tabular representations showing tokenization and reversal of tokenization of sensitive data executed by the data retirement engine, according to an embodiment herein.

FIG. 13 exemplarily illustrates a token mapping table comprising mapping information associated with mapping of sensitive data to tokens, according to an embodiment herein.

The specific features of the embodiments herein are shown in some drawings and not in others for convenience only as each feature may be combined with any or all of the other features in accordance with the embodiments herein.

DETAILED DESCRIPTION

Various aspects of the present disclosure may be embodied as a system, a method, or a non-transitory, computer-readable storage medium having one or more computer-readable program codes stored thereon. Accordingly, various embodiments of the present disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit".

Figure 1:
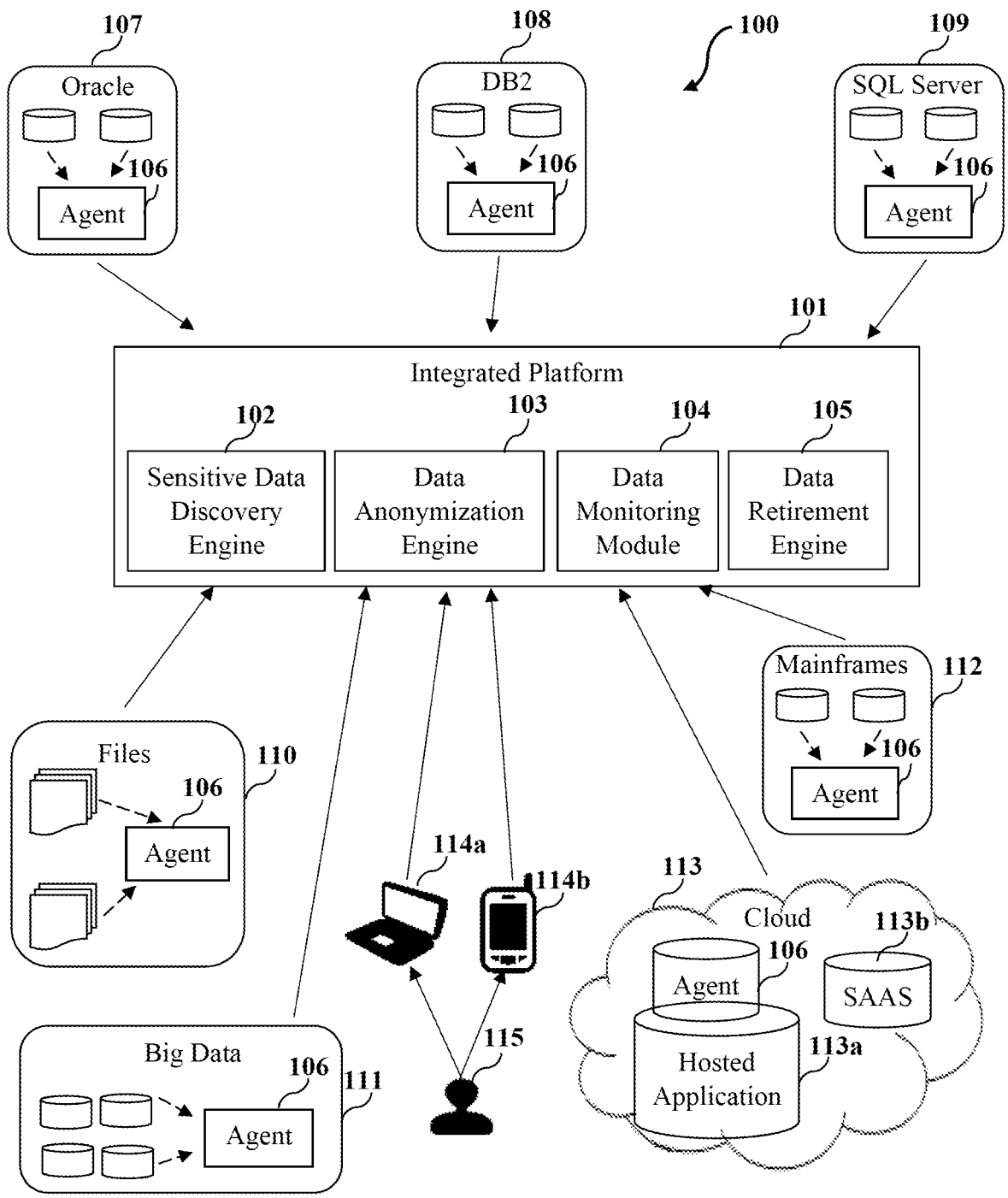
FIG. 1 illustrates a block diagram of a system for integrating and managing security of sensitive data across a lifecycle of the sensitive data, according to an embodiment herein.

FIG. 1 illustrates a block diagram of a system 100 for integrating and managing security of sensitive data across a lifecycle of the sensitive data, according to an embodiment herein. The sensitive data comprises, for example, personal identification information, financial information, healthcare information, etc. According to an embodiment herein, the system 100 comprises an integrated platform 101 in communication with multiple similar and variant data sources, for example, 107, 108, 109, 110, 111, 112, and 113. The similar and variant data sources, also referred to as "data stores", comprise relational databases, hierarchical databases, server applications, file systems, text, documents, external files, complex data locations, composite data locations, unvalidated fields, binary large objects (BLOBs), character large objects (CLOBs), key value pairs, phantom tables, structured data sources, unstructured data sources, mainframes, cloud data sources, and big data sources. According to an embodiment herein, the integrated platform 101 is implemented in a cloud computing environment comprising, for example, public cloud platforms and private cloud platforms. As used herein, "cloud computing environment" refers to a processing environment comprising configurable computing physical and logical resources, for example, networks, servers, storage media, virtual machines, applications, services, etc., and data distributed over a network, for example, the internet. The cloud computing environment provides an on-demand network access to a shared pool of the configurable computing physical and logical resources. According to another embodiment herein, the integrated platform 101 is a cloud computing-based platform implemented as a service for integrating and managing security of sensitive data across a lifecycle of the sensitive data. According to another embodiment herein, the integrated platform 101 is implemented as an on-premise software installed and run on computers on the premises of an organization. According to another embodiment herein, modules of the integrated platform 101 are deployed and implemented on a software agent 106 on each of the similar and variant data sources. For example, the modules of the integrated platform 101 are deployed and implemented on an agent 106 on each of the data sources comprising, for example, the Oracle® server 107 of Oracle international Corporation, the DB2® relational database management system (RDBMS) 108 of International Business Machines Corporation, a structured query language (SQL) server 109, files 110, big data sources 111, mainframes 112, and cloud data sources 113 as exemplarily illustrated in FIG. 1. According to an embodiment herein, in the cloud data sources 113, the modules of the integrated platform 101 are implemented, for example, in a software agent 106 on a hosted application 113a in communication with a software as a system (SaaS) component 113b. Through the agent 106 on each of the similar and variant data sources, the integrated platform 101 implements engine-based scanning and the agent-based scanning to provides flexibility to users in the discovery of the sensitive data. According to an embodiment herein, the integrated platform 101 performs scanning operations on the data at each of the similar and variant data sources. According to another embodiment herein, the integrated platform 101 retrieves the data from the similar and variant data sources and then performs the scanning operations on the retrieved data.

According to an embodiment herein, the integrated platform 101 is accessible to user devices, for example, 114a and 114b, through a broad spectrum of technologies and devices such as personal computers with access to the internet, internet enabled cellular phones, tablet computing devices, etc. The user devices, for example, 114a and 114b, are electronic devices such as personal computers, tablet computing devices, mobile computers, mobile phones, smart phones, portable computing devices, laptops, personal digital assistants, wearable computing devices such as smart glasses, smart watches, etc. touch centric devices, workstations, client devices, portable electronic devices, network enabled computing devices, interactive network enabled communication devices, or any other suitable computing equipment and combinations of multiple pieces of computing equipment. Each of the user devices, for example, 114a and 114b, implements applications comprising, for example, web browsing applications, mapping applications, electronic mail (email) applications, etc. In the system 100 disclosed herein, the integrated platform 101 interfaces with computer systems comprising the data sources, for example, 107, 108, 109, 110, 111, 112, and 113 and the user devices, for example, 114a and 114b, and therefore more than one specifically programmed computer system is used for integrating and managing security of sensitive data across a lifecycle of the sensitive data.

According to an embodiment herein, the integrated platform 101 comprises a sensitive data discovery engine 102, a data anonymization engine 103, a data monitoring module 104, and a data retirement engine 105. The sensitive data discovery engine 102 determines sensitive data by executing one or more of multiple match operations in a scanning pathway on data in each of a plurality of similar and variant data sources and applications for a selected unique data classification as disclosed in the US non-provisional patent application with application Ser. No. 16/541,589, filed on Aug. 15, 2019. The sensitive data discovery engine 102 receives administration and system privileges to access the data from multiple similar and variant data sources and applications. The applications accessed by the sensitive data discovery engine 102 comprise, for example, application forms, pages, queries, reports, etc. According to an embodiment herein, the sensitive data discovery engine 102 categorizes the data sources that are potentially sensitive and identifies the sensitive data there within.

According to an embodiment herein, the sensitive data discovery engine 102 configures unique data classifications of the data based on definitions for the unique data classifications received from a user device via a graphical user interface (GUI) provided by the sensitive data discovery engine 102 or retrieved from a data store. The unique data classifications are predefined or configurable via the GUI. The unique data Classifications comprise, for example, a national identifier, a credit card number, bank account information, first name, last name, other names, address, phone, electronic mail (email) addresses, internet protocol (IP) addresses, date of birth, salary, nationality, religion, home country, home city, airport code, insurance category, people groups, grades, positions, etc. According to an embodiment herein, the unique data classifications are predefined by the application logic. The application logic defines the constitution of sensitive data in source systems spanning multiple similar and variant data sources and applications. The sensitive data discovery engine 102 configures unique data classifications of direct customer-identifying data comprising, for example, first name, last name, email address, phone number, postal address, etc. The sensitive data discovery engine 102 also configures unique data classifications of indirect customer-identifying data comprising, for example, passport identification number, account number, social security number, internet protocol address, company information, etc. The sensitive data discovery engine 102 also configures unique data classifications of potential customer-identifying data comprising, for example, birth information, language, marital status, credit rating, gender, etc. The sensitive data discovery engine 102 preconfigures unique data classifications of direct, indirect, and potential customer-identifying data.

According to an embodiment herein, the unique data classifications are configured through the GUI provided by the sensitive data discovery engine 102. In this embodiment, a user enters the unique data classifications through the GUI rendered on a user device. The sensitive data discovery engine 102 receives the entered unique data classifications from the user device via the GUI. The unique data classifications input to the sensitive data discovery engine 102 are transformed, processed, and executed by an algorithm in the sensitive data discovery engine 102. The sensitive data discovery engine 102 renders the data classifications configurable to allow flexible definitions of the data classifications. The sensitive data discovery engine 402 distinguishes the data classifications having the same patterns. The sensitive data discovery engine 102 implements classification methods based on patterns that support validation functions and validations based on master data. For data classifications that have the same patterns, the sensitive data discovery engine 102 runs validations to identify the type of data. For example, a credit card number would have 16 digits and would pass a checksum validation. Any other 16-digit number would not pass the checksum validation. According to an embodiment herein, the sensitive data discovery engine 102 executes the Luhn algorithm, also referred to as a modulus 10 algorithm, for validating identification numbers, for example, credit card numbers, international mobile equipment identity (IMEI) numbers, national provider identifier numbers, social insurance numbers, social security numbers, etc., that constitute sensitive data in accordance with the application logic. According to an embodiment herein, the sensitive data discovery engine 102 renders a GUI for allowing a user to enter multiple variations of a pattern, for example, NNNN-NNNN-NNNN, NNNNNNNNNNNNNNNN, NNNN, NNNN/NNNN/

NNNN/NNNN, etc. The sensitive data discovery engine 102 allows users to configure the patterns while also having an option to include or exclude certain patterns as required via the GUI. In addition to patterns, the sensitive data discovery engine 102 inspects the source code of the applications to configure unique data classifications. The sensitive data discovery engine 102 also scans source code to identify difficult-to-find locations, for example, temporary tables, backup tables, etc., containing sensitive data. The sensitive data discovery engine 102 therefore supports the configuration of the unique data classifications and allows addition of custom data classifications.

According to an embodiment herein, the sensitive data discovery engine 102 configures a scanning pathway for scanning the data based on a selected one of the unique data classifications. The scanning pathway defines a sequence of one or more match operations to be performed on the data for the selected unique data classification. The scanning pathway configures an order of execution of the match operations by the sensitive data discovery engine 102. The match operations comprise, for example, a master data field match operation, multiple dictionary match operations a code match operation, multiple pattern match operations, and multiple exact data match operations. For facilitating a master data field match operation, a user, for example, an application owner or a customer flags an internal repository containing sensitive data as a master data table. The master data field match operation comprises matching the data against fields and values defined in the master data table. In the master data field match operation, the sensitive data discovery engine 102 matches the data against fields, for example, column names and values defined in the master data table. If a match of the data with the sensitive data contained in the master data table is found and if a score assigned to the data exceeds a predefined threshold, the sensitive data discovery engine 102 deems the data as sensitive data.

According to an embodiment herein, the sensitive data discovery engine 102 configures a dictionary of patterns or strings. According, to another embodiment herein, the sensitive data discovery engine 102 retrieves available data dictionaries for performing a dictionary analysis and the dictionary match operations. In the dictionary match operations, the sensitive data discovery engine 102 determines all the occurrences of any pattern or string of the dictionary in the data. The dictionary match operations comprise matching the data against primary key and foreign key references, matching the data against exact column names, and matching the data against similar column names. The dictionary match operations comprise, for example, "Dictionary Match: Relationship", "Dictionary Match: Column Name", and "Dictionary Match. Column Name Expression". According to an embodiment herein, the sensitive data discovery engine 102 by determining documented relationships at a database level. For example, in the dictionary match operation, "Dictionary Match: Relationship", the sensitive data discovery engine 102 matches the data against primary key and foreign key references. According to another embodiment herein, the sensitive data discovery engine 102 identifies columns and tables for classification by comparing known table and column names, for example, address, against a data dictionary. In the dictionary match operation, "Dictionary Match: Column Name", the sensitive data discovery engine 102 matches the data against the exact column names defined. In the dictionary match operation, "Dictionary Match: Column Name", the sensitive data discovery engine 102 scans a heading of a column to identify the type of data contained within the column. For example, the sensitive data discovery engine 102 determines that a column with a beading "Nat_Iden" or other similar variations are likely to Contain national identifiers and therefore Classify the data Contained in the column as sensitive data. However, sometimes sensitive data can be present in columns that are flagged as "not sensitive" by a simple column match. In this case, the sensitive data discovery engine 102 performs a pattern match operation or a code match operation to verify the sensitivity of the column. According to another embodiment herein, the sensitive data discovery engine 102 identifies columns and tables for classification by performing a partial match, or comparison of known table and column names, for example Address_line_01, against the data dictionary. In the dictionary match operation, "Dictionary Match: Column Name Expression", the sensitive data discovery engine 102 matches the data against like or similar column names defined. In addition to performing dictionary match operations, the sensitive data discovery engine 102 performs matching based on values and application logic. For example, the sensitive data discovery engine 102 makes use of the validation function called a Luhn checksum calculation along with dictionary match operations to identify credit card numbers.

According to an embodiment herein, the sensitive data discovery engine 102 performs a code analysis to eliminate false positives and to document columns that may not contain any data, for example, in key-value temporary tables. As used herein, "false positive" refers to an error in data reporting where a result of a match operation falsely indicates a presence of sensitive data. The sensitive data discovery engine 102 reviews database code, application code, and master data fields, for example, using a procedural language for structured query language (PL/SQL) procedures. According to an embodiment herein, the code match operation comprises matching the data against database objects based on master data fields. The database objects refer to defined objects in a database that is used to store or reference data. In the code match operation, the sensitive data discovery engine 102 matches the data against database objects based on master data fields. According to an embodiment herein, the sensitive data discovery engine 102 performs a pattern analysis by implementing pattern recognition to identify known patterns of sensitive data. In the pattern match operations the sensitive data discovery engine 102 determines the presence of patterns, for example, in the form of tress structures or sequence patterns such as text strings, in the data. For example, for a data classification such as a credit card number, which is a 16-digit number, the sensitive data discovery engine 102 includes all possible pattern combinations NNNN-NNNN-NNNN-NNNN, NNNNNNNNNNNNNNNN, NNNN NNNN NNNN NNNN, NNNN/NNNN/NNNN/NNNN, etc., in the pattern match operations to capture all such patterns. The pattern combinations are configurable via the GUI. The pattern match operations comprise matching the data against character-based patterns. The pattern match operations comprise, for example, "Pattern Match", "Pattern Match: Validated with Functions", and "Pattern Match: Validated against Master Date". In the pattern match operation, "Pattern Match", the sensitive data discovery engine 102 matches the data against patterns defined like U—Uppercase, L—Lowercase, and N—Numeric. According to an embodiment herein, the sensitive data discovery engine 102 validates results of the pattern match operations against master data fields, or master validation functions, or any combination thereof. The sensitive data discovery engine 102 performs the validations based on the validation functions or by matching with master data. When the pattern match operation alone cannot be used to confidently establish whether the data is sensitive or not, the sensitive data discovery engine 102 uses the pattern match operations, "Pattern Match: Validated with Functions" and/or "Pattern Match: Validated against Master Data".

According to an embodiment herein, the pattern match operation, "Pattern Match: Validated with Functions", depends on the configured scanning pathway. In the pattern match operation, "Pattern Match: Validated with Functions", the sensitive data discovery engine 102 validates the results of the pattern match operation, "Pattern Match", against validation functions configured by the sensitive data discovery engine 102. The sensitive data discovery engine 102 utilizes multiple types of validation functions in conjunction with the results of the pattern match operations. For example, to validate a 16-digit credit card number 9876 5432 1012 3456, which could be any number, the sensitive data discovery engine 102 implements a validation function defined by the Luhn algorithm. In another example, since credit cards and debit cards follow a set pattern and associated conditions, the sensitive data discovery engine 102 validates a Mastercard number by determining whether the number begins with the numbers "51" through "55". The sensitive data, discovery engine 102 configures such validation functions in the scanning pathway while searching for credit card numbers and debit card numbers. The sensitive data discovery engine 102 performs the pattern match operation "Pattern Match: Validated with Functions", when master data fields are not available across the similar and variant data sources. The pattern match operation, "Pattern Match: Validated against Master Data", depends on the configured scanning pathway. In the pattern match operation, "Pattern Match: Validated against Master Data", the sensitive data discovery engine 102 validates the results of the pattern match operation, "Pattern Match", against master data fields to minimize or eliminate false positives.

According to an embodiment herein, the sensitive data discovery engine 102 implements natural language processing comprising named entity recognition (NER) for classifying text into predefined categories called entities, for example, "person", "organization", etc. The entities are predefined categories generated by the NER for identifying and classifying data in free text. Entities are not equivalent to data classifications, for example, card identification numbers (CIDs) but provide additional context. The sensitive data discovery engine 102 assigns the entities to data classifications in a one-to-many mapping similar to assigning patterns to data classifications.

According to an embodiment herein, the sensitive data discovery engine 102 performs a data analysis in the exact data match operations. According to an embodiment herein, the exact data match operations comprise matching the data against column values, or master data values defined in master data tables, or a preconfigured repository of values, or any combination thereof. In the exact data match operations, the sensitive data discovery engine 102 also searches for a specific string value. For example, if a particular employee identifier (ID) needs to be discovered within a data source for subsequent deletion, the sensitive data discovery engine 102 scans the data source to identify all data locations where the input employee ID has been entered. The exact data match operations comprise, for example, "Exact Data Match: Master Data", "Exact Data Match: Repository", and "Exact Data Match: Entered Value". In the exact data match operation, "Exact Data Match: Master Data", the sensitive data discovery engine 102 matches the data against master data values defined in a master data table. To eliminate false positives, the exact data match operation, "Exact Data Match: Master Data", compares discovered column data against known column data. In the exact data match operation, "Exact Data Match: Repository", the sensitive data discovery engine 102 matches the data against a repository of values created by the sensitive data discovery engine 102. In the exact data match operation, "Exact Data Match: Entered Value", the sensitive data discovery engine 102 matches the data against column values defined in the exact data match operation.

According to an embodiment herein, the sensitive data discovery engine 102 renders a graphical user interface (GUI) on a user device to allow a user to select one or more match operations. The sensitive data discovery engine 102 receives the selected match operations via the GUI and configures the scanning pathway for the selected unique data classifications. For example, the sensitive data discovery engine 102 configures a scanning pathway defining a sequence of a master data field match operation, a dictionary match operation based on a column name, another dictionary match operation based on a column name expression, a pattern match, and a pattern match validated with functions for discovery of a national identifier. The scanning pathway that defines the sequence of match operations to be performed for discovering the sensitive data is fully configurable and is dependent on the data classification to be discovered. For example, the sensitive data discovery engine 102 configures the following scanning pathway to identify the data classification, "National identifier": (1) Master Data Field; (2) Dictionary Match: Column Name; (3) Dictionary Match: Column Name Expression; (4) Pattern Match; and (5) Pattern Match: Validated with Functions. In another example, the sensitive data discovery engine 102 configures the following scanning pathway to identify the data classification, "first name": (1) Master Data Field and (2) Dictionary Match: Column Name. According to an embodiment herein, the sensitive data discovery engine 102 configures a predefined sequence of the match operations for a default data classification based on past operations.

According to an embodiment herein, the sensitive data discovery engine 102 executes the selected match operations in the configured scanning pathway on the data for the selected unique data classification based on the received selection of a scan level. The scan level comprises a full scan of the entirety of the data from the similar and variant data sources and applications, a sample scan of a predefined number of data locations in the similar and variant data sources and applications, and an incremental scan of newly added data locations. The sensitive data discovery engine 102 executes the match operations selected, for example, from a master data field match operation, multiple dictionary match operations, a code match operation, multiple pattern match operations, and multiple exact data match operations in the configured scanning pathway on the data for the selected unique data classification. The sensitive data discovery engine 102 executes the selected match operations sequentially as defined in the configured scanning pathway. If the user selects the full scan via the GUI, the sensitive data discovery engine 102 executes the selected match operations on the entirety of the data within the source systems spanning multiple similar and variant data sources and applications. If the user selects the sample scan via the GUI, the sensitive data discovery engine 102 executes the selected match operations on a predefined number of data locations, for example, rows or columns within a data source. If the user selects the incremental scan via the GUI, the sensitive data discovery engine 102 executes the selected match operations on newly added columns, files, or other data sources. According to an embodiment herein, the sensitive data discovery engine 102 allows users to reconfigure the scanning pathway and reorder the sequence of execution of the selected match operations via the GUI. The users may also deselect one or more of the match operations for execution in the scanning pathway. The sensitive data discovery engine 102 provides a check or uncheck option on the GUI to allow the users to include or exclude a match operation in the scanning pathway. The sensitive data discovery engine 102 therefore scans database tables, columns and rows based on defined unique data classifications, for example, national identifier, first name, last name, credit card number, etc., and provides results pertaining to the location of sensitive data. The method of scanning is data classification centric with scanning pathways and a scorecard mechanism as disclosed in the US non-provisional patent application with application Ser. No. 16/541,589.

According to an embodiment herein, the sensitive data discovery engine 102 determines sensitive data, for example, within 2 or 3 iterations. In the determination of the sensitive data, the sensitive data discovery engine 102 classifies the data as sensitive data, or potentially sensitive data, or not sensitive data based on the executed match operations in the configured scanning pathway. The sensitive data discovery engine 102 configures the scanning pathway defining the sequence of the selected match operations to be performed on the accessed data to scan and flag a data location, for example, a column as sensitive to ensure optimal performance for classifying the data as sensitive, potentially sensitive, or not sensitive, thereby minimizing false positives and ensuring a comprehensive discovery of sensitive data. In addition to determining the sensitive data, the sensitive data discovery engine 102 renders the locations of the sensitive data in source systems spanning multiple similar and variant data sources and applications that are identified using the configured scanning pathway and the scorecard mechanism.

The sensitive data discovery engine 102 identifies application codes that operate on the determined sensitive data. Apart from patterns, the sensitive data discovery engine 102 also inspects source codes of the applications to determine whether the data is sensitive or not. The sensitive data discovery engine 102 analyzes SQL code to determine what operations are being performed, particularly those that involve data locations, for example, tables and columns, containing sensitive data. On determining the data locations, for example, tables and columns that are sensitive, the sensitive data discovery engine 102 identifies actions concerning these data locations. The sensitive data discovery engine 102 scans application code and user information comprising user behavioural information, and determines what users and programs access the sensitive data. The sensitive data discovery engine 102 provides details of the application programs accessing the sensitive data and the users who have access to and access the sensitive data. The sensitive data discovery engine 102 performs an analysis of user access and maps the user access to the sensitive data.

The sensitive data discovery engine 102 generates sensitive data discovery intelligence comprising metadata, results of the determination of the Sensitive data herein referred to as "discovery results", locations of the determined sensitive data, and information of users and programs that access the determined sensitive data by inspecting the identified application codes. The locations of the determined sensitive data comprise, for example, schema, tables, columns, complex columns, rows, free text fields, description fields, unvalidated fields, key value pairs, etc. According to an embodiment herein, the sensitive data discovery intelligence further comprises historical data related to the determination of the sensitive data and relationships of the users with the sensitive data. The sensitive data discovery intelligence provides a complete determination of where the sensitive data is, how the sensitive data is being used, and who or what has access to the sensitive data. The sensitive data discovery intelligence allows maintenance of data relationships and referential integrity. The sensitive data discovery engine 102, therefore, provides sensitive data discovery intelligence comprising the locations of the sensitive data and who has access to the sensitive data based on predefined and configurable unique data classifications of the data stored in multiple similar and variant data sources.

The sensitive data discovery engine 102 implements a discovery process based on metadata of an application using different data classifications to further generate a template or a data map that is a result of the discovery process. According to an embodiment herein, the sensitive data discovery engine 102 generates one or more templates comprising the sensitive data discovery intelligence and data security rules for managing the security of the determined sensitive data across the lifecycle of the determined sensitive data. The generated templates provide a data map of sensitive data with complete information of the discovery of the sensitive data and relationships present. The generated templates are configured for extended use in downstream data security operations. The downstream data security operations for which the generated templates are used comprise, for example, data anonymization including data masking, data encryption, data tokenization, etc., data monitoring, data retirement, etc. The sensitive data discovery engine 102 generates metadata within source systems spanning multiple similar and variant data sources and applications for enterprise data security operations. The sensitive data discovery engine 102 discovers sensitive data by inspecting data and metadata with respect to the data classification and by introspecting application code to determine which users and what programs access the sensitive data. The sensitive data discovery intelligence generated by the sensitive, data discovery engine 102 is used for downstream data security operations. The results of funning the sensitive data discovery engine 102 on the data sources and the applications are used, for example, for data mapping, data lineage related uses, and other data security operations. According to an embodiment herein, the sensitive data discovery engine 102 performs the generation of the sensitive data discovery intelligence and the templates simultaneously or in parallel. According to an embodiment herein, the sensitive data discovery engine 102 stores the sensitive data discovery intelligence in a single location of the integrated platform 101.

According to an embodiment herein, the sensitive data discovery engine 102 receives and inserts the data security rules into the sensitive data discovery intelligence for managing the security of the determined sensitive data across the lifecycle of the determined sensitive data. The data security rules comprise information pertaining to the subsequent downstream data protection operations, for example, data anonymization to be executed by the data anonymization engine 103, data monitoring to be executed by the data monitoring module 104, and data retirement to be executed by the data retirement engine 105. The data security rules comprise configuration rules for anonymization, monitoring, and retirement of the determined sensitive data. According to an embodiment herein, the configuration rules for the anonymization of the determined sensitive data comprise authorization information of the users, that is, information regarding authorized and unauthorized users. According to another embodiment herein, the configuration rules for the anonymization of the determined sensitive data comprise anonymization, authorization and monitoring information of the users. According to an embodiment herein, the sensitive data discovery engine 102 configures the templates as one or more anonymization templates, one or more monitoring templates, and one or more retirement templates. Each of the anonymization templates, the monitoring templates, and the retirement templates comprises the sensitive data discovery intelligence and the data security rules.

According to an embodiment herein, the sensitive data discovery engine 102 distributes the generated templates to the data anonymization engine 103, the data monitoring module 104, and the data retirement engine 105 of the integrated platform 101 deployed on each of the similar and variant data sources. The distribution of the generated templates to the data anonymization engine 103, the data monitoring module 104, and the data retirement engine 105 of the integrated platform 101 deployed on each of the similar and variant data sources allows sharing or use of the metadata or intelligence of the sensitive data discovery engine 102 by the data anonymization engine 103, the data monitoring module 104, and the data retirement engine 105 in the integrated platform 101. By integrating the data anonymization engine 103, the data monitoring module 104, and the data retirement engine 105 with the sensitive data discovery engine 102, the sensitive data discovery intelligence of the sensitive data discovery engine 102 is shared or used by the data anonymization engine 103, the data monitoring module 104, and the data retirement engine 105 for downstream data security.

According to an embodiment herein, the integrated platform 101 executes the sensitive data discovery intelligence, the data security rules and other metadata stored in the templates at each of the similar and variant data sources using an agent 106 deployed by the integrated platform 101 in each of the similar and variant data sources. According to an embodiment herein, the integrated platform 101 generates agents 106 for the downstream data security operations comprising data anonymization, data monitoring, and data retirement and deploys the agents 106 locally at the similar and variant data sources, for example, 107, 108, 109, 110, 111, 112, 113, etc., as illustrated in FIG. 1. According to another embodiment herein, the data anonymization engine 103, the data monitoring module 104, and the data retirement engine 105 are deployed in and executed by the agent 106 of each of the similar and variant data sources.

According to an embodiment herein, the data anonymization engine 103 flexibly and consistently anonymizes the determined sensitive data of multiple data types accessible by one or More of the applications using the generated templates based on application architecture as disclosed in detail in the US non-provisional patent application with application Ser. No. 16/656,341, filed on Oct. 17, 2019. According to an embodiment herein, the data monitoring module 104 continuously monitors access of the determined sensitive data by users and the applications or programs using the generated templates as disclosed in detail in the US non-provisional patent application with application Ser. No. 16/656,341, filed on Oct. 17, 2019.

According to an embodiment herein, the data retirement engine 105 determines and retires inactive sensitive data from the determined sensitive data without removing transactional data therefrom using the generated templates. The data retirement engine 105 is a sensitive data deidentification module that allows an organization to tokenize or archive inactive sensitive data after a functional use of the inactive sensitive data. According to an embodiment herein, the data retirement engine 105 retires the sensitive data based on defined policies and rules that specify inactive sensitive data. According to another embodiment herein, the data retirement engine 105 performs minimization of the sensitive data by allowing an organization, for example, an enterprise, to tokenize inactive sensitive data. The data retirement engine retires the sensitive data by tokenization using multiple tokenizers as disclosed in the detailed descriptions of FIGS. 5-14. According to another embodiment herein, the data retirement engine 105 performs minimization of the sensitive data by allowing an organization to archive inactive sensitive data. Therefore, on completion of a beneficial lifecycle of the sensitive data, the data retirement engine 105 allows enterprises to hide and/or deidentify the sensitive data to prevent unnecessary exposure. For example, if an employee has resigned from an organization, there is no need to maintain the sensitive data related to the employee and increase the risk of exposure of that employee's sensitive data, According to an embodiment herein, the data retirement engine 105 allows the organization to hide and/or deidentify that employee's sensitive data by tokenizing the inactive sensitive data and securely deidentifying the inactive sensitive data to reduce the risk of exposure. According to an embodiment herein, the integrated platform 101 deploys agents 106 that implement the data retirement engine 105 on target data sources and applications to initiate the retirement of the sensitive data at the target data sources and the applications. The integrated platform 101 allows a user 115 to view results of the analysis performed by the integrated platform 101 on a user device 114a or 114b and receive alerts when the sensitive data is accessed using monitoring templates.

The integrated platform 101 disclosed herein implements one or more specific computer programs for integrating and managing security of sensitive data across a lifecycle of the sensitive data. The method disclosed herein improves the functionality of a computer and provides an improvement in data security technology related to integrating and managing security of sensitive data across a lifecycle of the sensitive data as disclosed above. The focus of the integrated platform 101 and the method is on an improvement to data security technology and computer functionalities, and not on tasks for which a generic computer is used in its ordinary capacity. Rather, the integrated platform 101 and the method disclosed herein are directed to a specific improvement to the way the processors in the system 100 illustrated in FIG. 1 operate, embodied in, for example, integrating the sensitive data di cover engine 102, the data anonymization engine 103, the data monitoring module 104, and the data retirement engine 105 in the integrated platform 101; determining sensitive data; identifying application codes that operate on the sensitive data; generating sensitive data discovery intelligence; generating the templates; distributing the templates with the data security rules to the data anonymization engine 103, the data monitoring module 104, and the data retirement engine 105 deployed on each of the similar and variant data sources; flexibly and consistently anonymizing the sensitive data; continuously monitoring access of the sensitive data by the users and the applications; and determining and retiring inactive sensitive data from the sensitive data without removing transactional data therefrom.

In the method disclosed herein, the design and the flow of data and interactions between the sensitive data discovery engine 102, the data anonymization engine 103, the data monitoring module 104, and the data retirement engine 105 in the integrated platform 101 and in the agents 106 deployed on the similar and variant data sources and applications are deliberate, designed, and directed. The interactions between the sensitive data discovery engine 102, the data anonymization engine 103, the data monitoring module 104, and the data retirement engine 105 in the integrated platform 101 and in the agents 106 deployed on the similar and variant data sources and applications allow the integrated platform 101 to integrate and manage security of sensitive data across a lifecycle of the sensitive data. The steps performed by the integrated platform 101 disclosed above requires nine or more separate computer programs and subprograms, the execution of which cannot be performed by a person using a generic computer with a generic program. The steps performed by the integrated platform 101 disclosed above are tangible, provide useful results, and are not abstract. The hardware and software implementation of the system 100 disclosed herein comprising the integrated platform 101 and one or more processors is an improvement in computer related and data security technology.

The method and the system 100 disclosed herein integrate data anonymization, data monitoring, and data retirement with sensitive data discovery by using the sensitive data discovery intelligence generated and shared from the discovery of the sensitive data, which ensures that all the locations of the sensitive data across complex source systems are identified and the manual effort and risk are minimized. The system 100 disclosed herein covers a large number of data sources, on-premise and on cloud, enterprise applications, etc., and is closely integrated with shared, sensitive data discovery intelligence, where the sensitive data discovery intelligence is shared for downstream data security operations such as data anonymization, data monitoring, and data retirement. The integrated platform 101 is implemented enterprise-wide across structured, unstructured, cloud and big data sources. The method and the system 100 disclosed herein, therefore, scales discovery of the sensitive data across multiple similar and variant data sources including complex columns, composite columns, binary large objects, character large objects, key value pairs, phantom tables, etc., and applications, and allows enterprises to conveniently track the locations of the sensitive data and take appropriate measures to protect the sensitive data.

In addition to identifying the sensitive data and the locations of the sensitive data, the method and the system 100 disclosed herein determine the users and the programs or the application codes that have access to and that have accessed the sensitive data and identify reasons and attributes for classifying sensitive data. The method and the system 100 disclosed herein integrate and manage security of sensitive data across a lifecycle of the sensitive data from discovery to anonymization, monitoring, and retirement, thereby ensuring consistent anonymization and complete protection of the sensitive data. The integration provided by the method and the system 100 disclosed herein allows the sensitive data discovery intelligence of one data protection module, for example, the sensitive data discovery engine 102, to be shared or used by other data protection modules, for example, the data anonymization engine 103, the data monitoring module 104, and the data retirement engine 105 for downstream sensitive data security operations, for example, data anonymization or masking, data monitoring, data retirement, etc. Although architecture of an application is distributed, the method and the system 100 disclosed herein stores the sensitive data discovery intelligence in one location in the integrated platform 101. The integrated platform 101 provides consistency of discovery results across all data sources, preserves data, preserves performance integrity, has enterprise coverage, is minimally invasive, has low performance overheads, etc.

Figure 2:
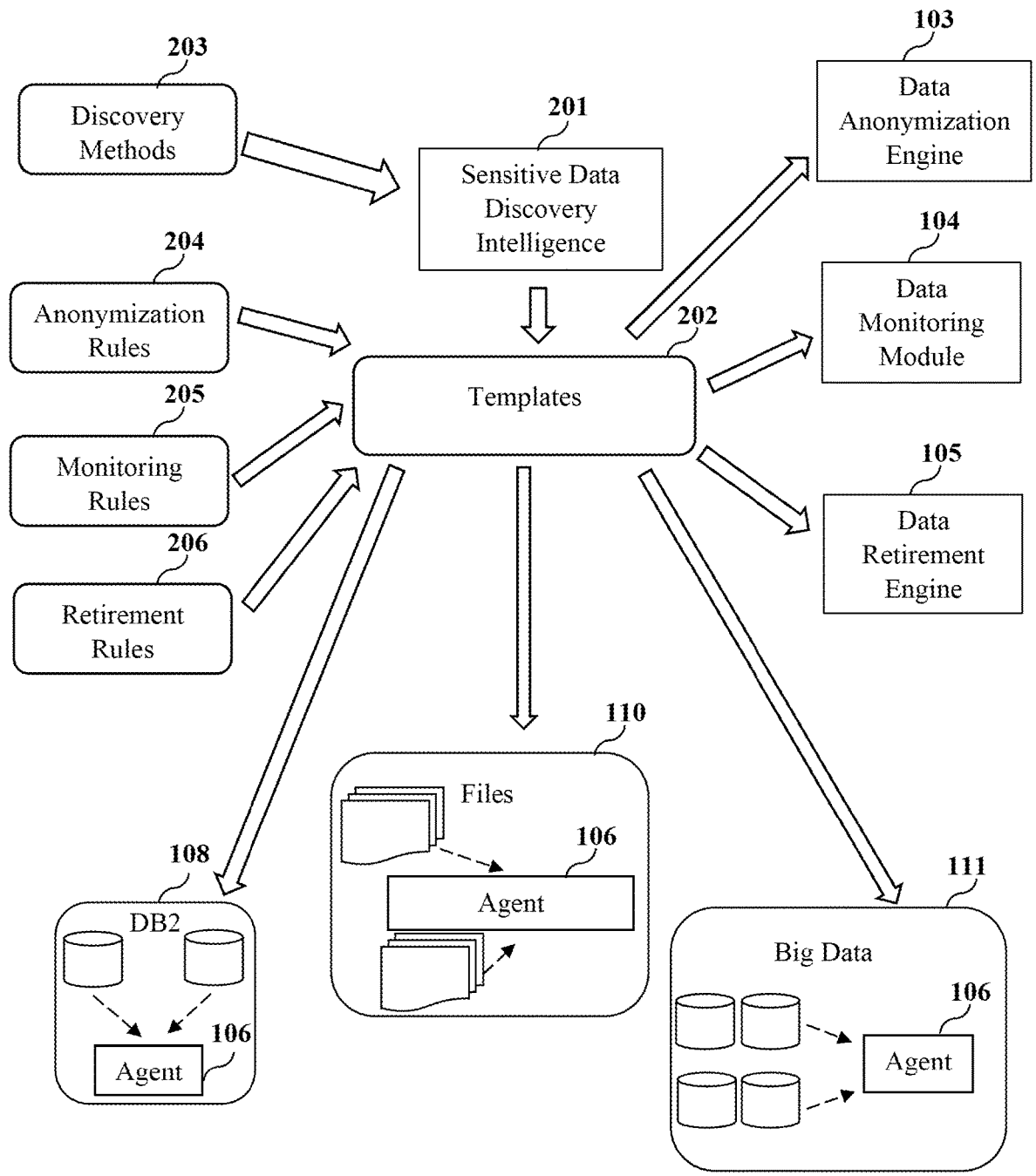
FIG. 2 illustrates a functional block diagram showing generation and sharing of sensitive data discovery intelligence by a sensitive, data discovery engine with a data anonymization engine, a data monitoring module, and a data retirement engine of an integrated platform, for managing security of sensitive data across a lifecycle of the sensitive data, according to an embodiment herein.

FIG. 2 illustrates a functional block diagram showing generation and sharing of sensitive data discovery intelligence 201 by the sensitive data discovery engine 102 with the data anonymization engine 103, the data monitoring module 104, and the data retirement engine 105 of the integrated platform 101 shown in FIG. 1, for managing security of sensitive data across a lifecycle of the sensitive data, according to an embodiment herein. The integrated platform 101 is a single platform that implements comprehensive and complete sensitive data security from providing peripheral security in terms of access management of sensitive data to a data classification centric security of discovery, anonymization, monitoring, and retirement or minimization of the sensitive data. The integrated platform 101 monitors sensitive data continuously through the data monitoring module 104 and securely deidentifies sensitive data through the data anonymization engine 103. The integrated platform 101 not only provides an integrated approach to data security, but also supports a wide range and number of enterprise data sources from relational databases such as the DB2® relational database management system (RDBMS) 108, files 110, big data sources 111, cloud data sources, mainframes, etc.

The integrated platform 101 implements a number of methods for data protection by means of data discovery, data anonymization data monitoring, and data retirement. The integrated platform 101 implements data security through a systematic approach by first discovering all the sensitive data within a data source by using the sensitive data discovery engine 102. The integrated platform 101 then executes applicable data protection mechanisms comprising, for example, data masking, encryption, and tokenization to the determined sensitive data by using the data anonymization engine 103. Apart from these anonymization options, the integrated platform 101 also monitors the sensitive data for users as well applications that access the sensitive data by using the data monitoring module 104. The integrated platform 101 then retires any inactive sensitive data from the data source by using the data retirement engine 105 that deletes or tokenizes inactive sensitive data, thereby eliminating unnecessary risk.

The sensitive data discovery engine 102 determines sensitive data and identifies application codes that operate on the determined sensitive data as disclosed in the detailed description of FIG. 1. The sensitive data discovery engine 102 scans database tables, columns, and rows using various discovery methods 203 based on defined data classifications consistently across multiple similar and variant data sources to provide discovery results pertaining to the locations of sensitive data. The sensitive data discovery engine 102 generates sensitive data discovery intelligence 201 comprising metadata, data, programs, discovery results such as locations of the determined sensitive data, information of users and programs that access the determined sensitive data by inspecting the identified application codes, etc. According to an embodiment herein, the sensitive data discovery intelligence 201 is an inventory of applications, databases, tables, rows, and columns. The sensitive data discovery engine 102 generates templates 202 comprising the sensitive data discovery intelligence 201 and data security rules. The data security rules comprise masking or anonymization rules 204, monitoring rules 205, and retirement rules 206. The sensitive data discovery engine 102 generates the templates 202 from the results of the discovery process and the shared sensitive data discovery intelligence 201. The integrated platform 101 stores a set of methods and rules, for example, discovery methods 203, anonymization rules 204, monitoring rules 205, and retirement rules 206 in a data store and applies to the set of methods and rules to the templates 202. The discovery methods 203 comprise data classification rules and data discovery rules that identifies which location contains what type of data. The discovery methods 203, the anonymization rules 204, the monitoring rules 205, and the retirement rules 206 are further used for downstream anonymization, pseudonymization, masking, encryption, monitoring, and retirement of the sensitive data. According to an embodiment herein, the sensitive data discovery engine 102 shares the templates 202 with the data anonymization engine 103, the data monitoring module 104, and the data retirement engine 105 for performing downstream anonymization, monitoring, and retirement of the sensitive data respectively, as disclosed in the detailed description of FIG. 1. The sensitive data discovery engine 102 shares the templates 202 across pre-production, production, and non-production environments as disclosed in the detailed description of FIG. 3. The integrated platform 101 then deploys the agents 106 on the target data sources, for example, 108, 110, 111, etc., in the pre-production, production and non-production environments as required.

Figure 3:
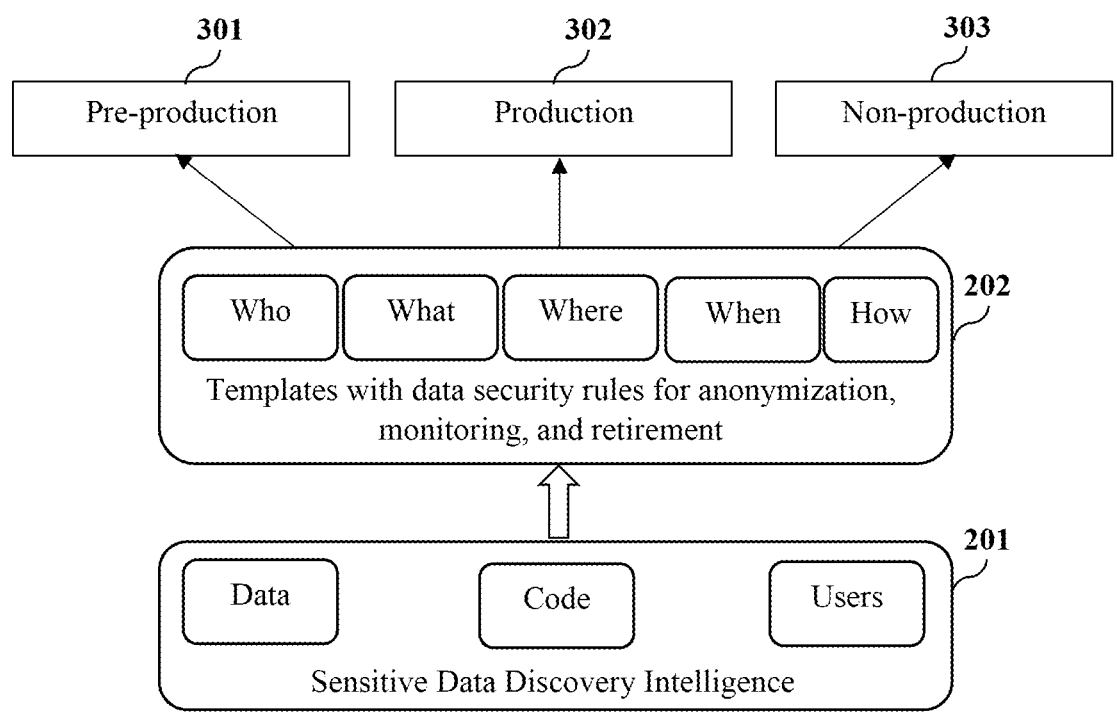
FIG. 3 illustrates a block diagram showing a usage of sensitive data discovery intelligence and corresponding templates in pre-production, production, and non-production environments, according to an embodiment herein.

FIG. 3 illustrates a block diagram showing a usage of sensitive data discovery intelligence 201 and corresponding templates in a pre-production environment 301, a production environment 302, and a non-production environment 303 according to an embodiment herein. The sensitive data discovery engine 102 of the integrated platform 101 shown in FIG. 1, generates the sensitive data discovery intelligence 201 and templates 202 with the data security rules as disclosed in the detailed description of FIG. 1. The templates 202 provide information on who accesses the sensitive data, what sensitive data is accessed, from where connections are made to the sensitive data, when the sensitive data is accessed, and how the sensitive data is accessed. According to an embodiment herein, the sensitive data discovery engine 102 receives and inserts data security rules, for example, discovery methods, anonymization rules, and other configuration rules for anonymizing, monitoring, and retiring the sensitive data, into the templates 202 for managing the security of the sensitive data across the lifecycle of the sensitive data. According to an embodiment herein, the sensitive data discovery engine 102 receives the data security rules based on user selection inputs and configuration inputs entered via a graphical user interface (GUI) rendered on a user device by the sensitive data discovery engine 102. The sensitive data discovery engine 102 shares the templates 202 with the data security rules across the pre-production environment 301, the production environment 302, and the non-production environment 303. The sensitive data discovery engine 102 configures the templates 202 to secure the determined sensitive data across the lifecycle of the determined sensitive data in the pre-production environment 301, the production environment 302, and the non-production environment 303.

In the pre-production environment 301, the production environment 302, and the non-production environment 303, the agents 106 deployed by the integrated platform 101 at each of the similar and variant data sources, receive and process the templates 202 with the data security rules from the sensitive data discovery engine 102 for performing downstream anonymization such as masking, encryption, tokenization, etc., monitoring, and retirement of the sensitive data. The agents 106 deployed by the integrated platform 101 at each of the similar and variant data sources execute computer programs defined by the downstream data protection modules, that is, the data anonymization engine 103, the data monitoring module 104, and the data retirement engine 105 for performing downstream anonymization, monitoring, and retirement of the sensitive data respectively. According to an embodiment herein, the agents 106 deployed by the integrated platform 101 at each of the similar and variant data sources perform static data masking and dynamic data masking in the pre-production environment 301. According to an embodiment herein, the agents 106 deployed by the integrated platform 101 at each of the similar and, variant data sources perform dynamic data masking, data monitoring, and data retirement in the production environment 302. According to an embodiment herein, the agents 106 deployed by the integrated platform 101 at each of the similar and variant data sources perform static data masking and sub-setting in the non-production environment 303, for example, a development environment, a testing, environment, a training, environment, etc.

Figure 4:
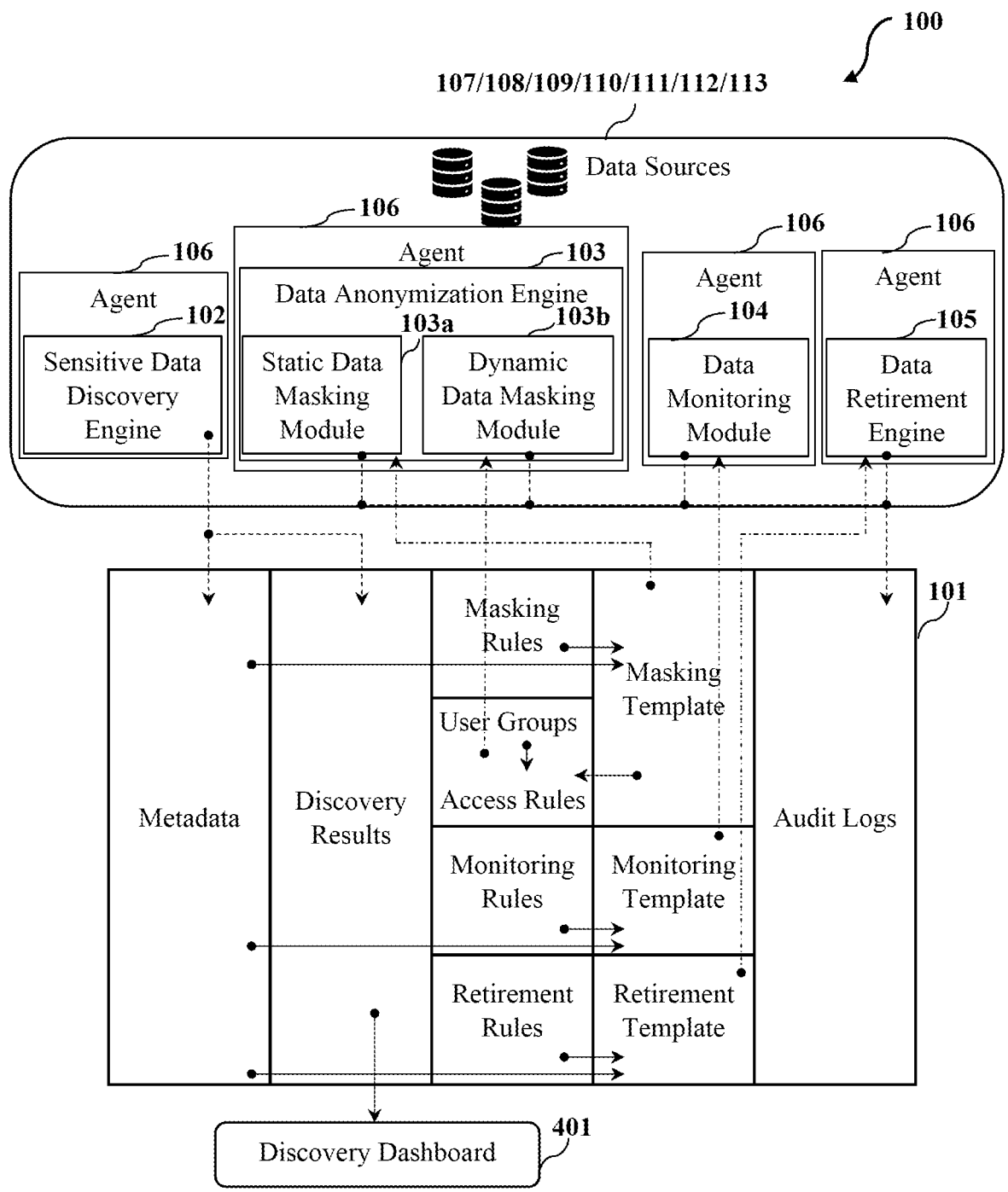
FIG. 4 illustrates a functional block diagram indicating the interactions between agents deployed at data sources and the integrated platform for integrating and managing security of sensitive data across a lifecycle of the sensitive data, according to an embodiment herein.

FIG. 4 illustrates a functional block diagram indicating the interactions between agents deployed at data sources 107, 108, 109, 110, 111, 112, and 113 and the integrated platform 101 for integrating and managing security of sensitive data across a lifecycle of the sensitive data, according to an embodiment herein. According to an embodiment herein, the integrated platform 101 implements an agent-based discovery of the sensitive data in each of the data sources. According to this embodiment, the sensitive data discovery engine 102 is executed by an agent 106 deployed at each of the data sources. The sensitive data discovery engine 102 sends metadata and the results of the discovery process, herein referred to as "discovery results", to the integrated platform 101. The metadata and the discovery results constitute the sensitive data discovery intelligence. According to an embodiment herein, the integrated platform 101 graphically represents the discovery results on a discovery dashboard 401. Furthermore, the sensitive data discovery engine 102 generates templates comprising the sensitive data discovery intelligence and the data security rules to the integrated platform 101. According to an embodiment herein, the integrated platform 101 receives the metadata and the discovery results from the sensitive data discovery engine 102 and generates the templates by inserting the data security rules.

According to an embodiment herein, the integrated platform 101 configures the templates, for example, as anonymization or masking templates, monitoring templates, and retirement templates, where each template comprises the sensitive data discovery intelligence and the data security rules. The data security rules comprise, for example, the discovery results the configuration rules for anonymization, monitoring, and retirement, etc. As used herein, "template" refers to a combination of rules that is configured along with the sensitive data discovery intelligence that is generated during the discovery process. For example, the integrated platform 101 configures the template as a masking template, a monitoring template, and a retirement template. The masking template which is used for the static data masking process by the static data masking module 103a of the data anonymization engine 103 comprises a combination of the sensitive data discovery intelligence along with masking rules. For dynamic data masking, the integrated platform 101 implements an additional layer called "user groups" comprising authorization information regarding authorized and unauthorized users. The authorization information along with the masking rules constitute "access rules". Similar to the masking template, the monitoring template and the retirement template comprise a combination of the sensitive data discovery intelligence along, with monitoring rules and retirement rules respectively.

After generation of the templates, the integrated platform 101 sends the masking template, the monitoring template, and the retirement template to the respective agents 106 at the data sources for respective downstream data security operations. For example, the integrated platform 101 sends the masking template to the agent 106 executing the static masking module 103a of the data anonymization engine 103 for static data masking of the sensitive data in each of the data sources. Similarly, the integrated platform 101 sends the masking template along with the access rules to the agent 106 executing the dynamic data masking module 103b of the data anonymization engine 103 for dynamic data masking of the sensitive data in each of the data sources. Moreover, the integrated platform 101 sends the monitoring template to the agent 106 executing the data monitoring module 104 for continuous monitoring of the sensitive data in each of the data sources. Furthermore, the integrated platform 101 sends the retirement template to the agent 106 executing the data retirement engine 105 for retiring the sensitive data in each of the data sources. The agent 106 deployed at each of the data sources then sends audit logs of the respective data security operations and processes back to the integrated platform 101 for storage in the integrated platform 101.

Figure 5:
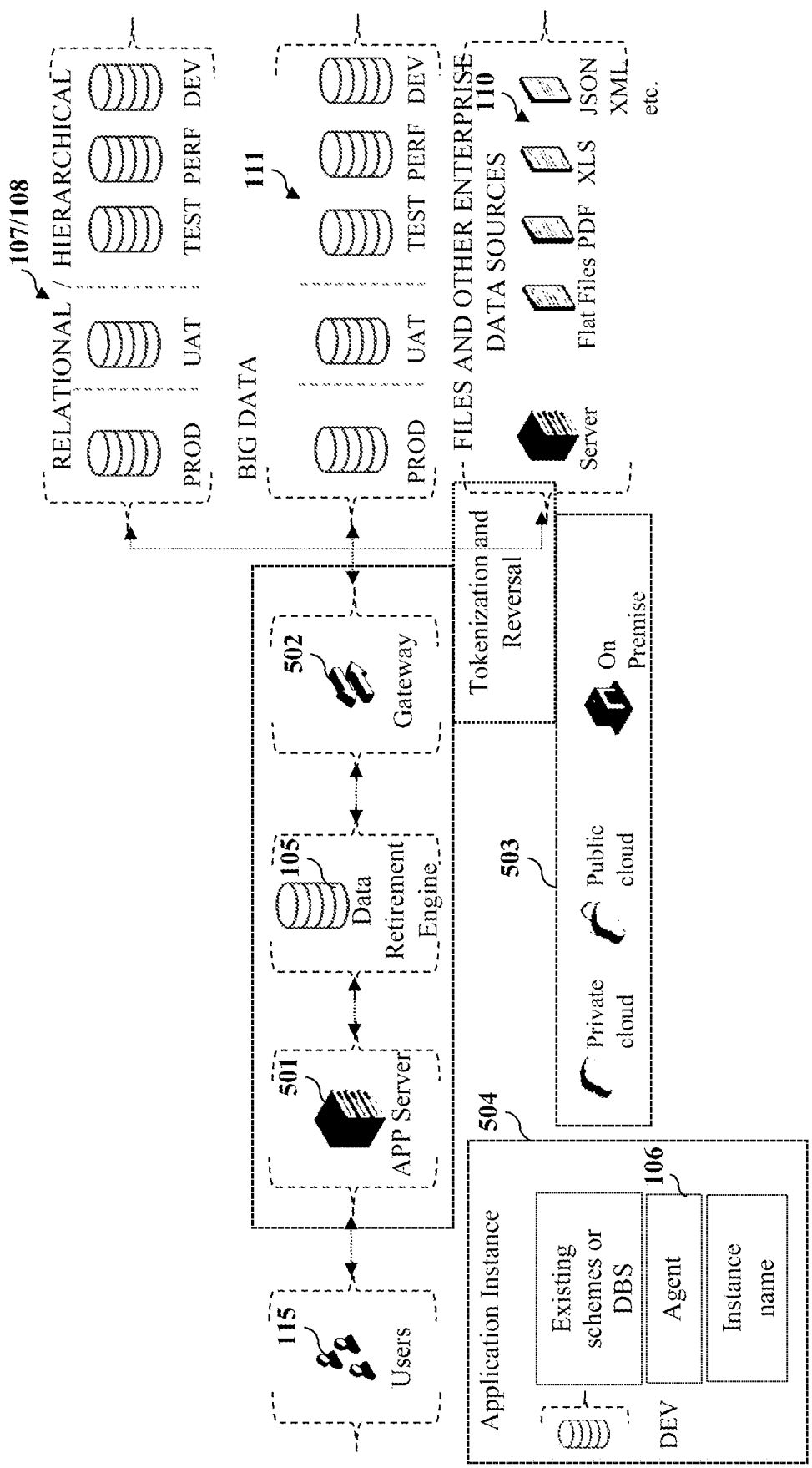
FIG. 5 illustrates a block diagram of the system comprising the data retirement engine for retiring sensitive data, according to an embodiment herein.

FIG. 5 illustrates a block diagram of the system comprising the data retirement engine for retiring sensitive data, according to an embodiment herein. In this embodiment, the system disclosed herein implements sensitive data retirement, also referred to as "sensitive data minimization", as a two-fold approach where inactive sensitive data is comprehensively discovered through the sensitive data discovery engine, followed by tokenization of the discovered sensitive data using an array of tokenizers that desensitize the discovered sensitive data, while retaining the transactional data. This two-fold approach ensures that inactive sensitive data in customer environments are thoroughly identified and tokenized, which results in substantial risk reduction. FIG. 5 illustrates an exemplary implementation of the data retirement engine 105 configured to tokenize sensitive data across multiple datastores, for example, relational and hierarchical databases 107, 108 such as those of the Oracle® E-Business Suite (EBS) the PeopleSoft® enterprise resource planning (ERP) application, the SQL server application, etc., big data sources 111, files 110 and other enterprise data sources. The data retirement engine 105 accesses the data stores via a gateway 502 as exemplarily illustrated in FIG. 5. The system allows users 115 to access the data retirement engine 105 via an application server 501. Each application instance 504 executes an agent 106 that implements the data retirement engine 105 to initiate the retirement of the sensitive data at the data stores. The data retirement engine 105 performs tokenization by executing a wide range of cryptographic and non-cryptographic algorithms as disclosed in the detailed descriptions of FIG. 7 and FIG. 10. The data retirement engine 105 expands the scope of data retirement from an on-premise platform to private and public cloud platforms 503. Being part of the integrated platform 101 illustrated in FIG. 1, the data retirement engine 105 seamlessly integrates with the sensitive data discovery engine 102, thereby ensuring that the inactive or user-requested sensitive data is comprehensively identified and securely retired from within production systems.

Figure 6:
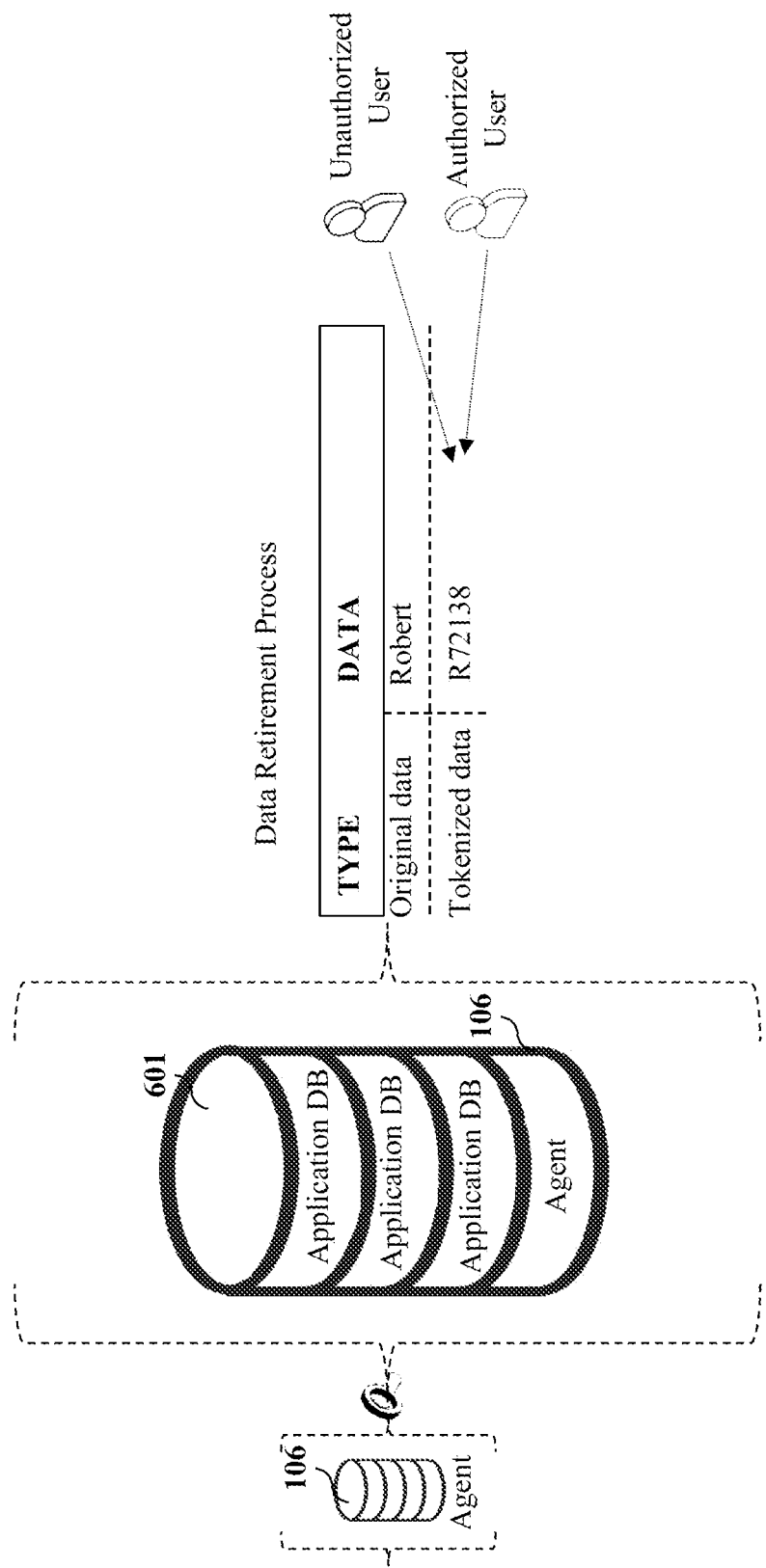
FIG. 6 exemplarily illustrates a schematic, showing a data retirement process executed by the data retirement engine, according to an embodiment herein.

FIG. 6 exemplarily illustrates a schematic showing a data retirement process executed by the data retirement engine, according to an embodiment herein. In an embodiment, an agent 106 that implements the data retirement engine 105 is operably coupled to application databases 601 as exemplarily illustrated in FIG. 6. The data retirement process executed by the data retirement engine 105 on the agent 106 comprises generation of tokens, creation of entities, configuration of tokenization or retirement rules, and determination of candidates for tokenization as disclosed in the detailed descriptions of FIGS. 7-10. As used herein, the term "entities" refers to business areas, for example, employees, customers, vendors, etc., and the term "candidates" refers, for example, to data sources or locations of the sensitive data undergoing data retirement. The data retirement engine 105 creates a tokenization job comprising the tokens, the entities, the tokenization or retirement rates, and the candidates to tokenization, allows a preview of the tokenization job, and executes a procedure to submit the tokenization job on the agent 106. The tokenization or retirement rules that are created on the application server that hosts the data retirement engine 105 are moved to the agent 106 and the tokenization job is submitted on the agent 106. The agent 106 executes update statements for the applicable data classification and tokenizes the sensitive data on a target data store. For example, the agent 106 updates original data "Robert" to tokenized data "R72138" in the target data store as illustrated in FIG. 6. The agent 106 allows the users to view the tokenized data only as the original data has been updated in the target data store. The agent 106 locates specific rows in which sensitive data, for example, customer information is present in the target data store, and proceeds to tokenize operational data contained in the sensitive data, thereby ensuring compliance with regulatory requirements, while also maintaining, transactional integrity of the target data store. According to an embodiment herein, the agent 106 stores the tokenized data or values in a token mapping table, thereby allowing retrieval of data in the future. According to an embodiment herein, the agent 106 allows organizations to delete the token mapping table in cases where the sensitive data has passed a retention period. In cases where the retention period is ongoing, the agent 106 maintains the token mapping table. The data retirement engine 105, therefore, provides flexibility to organizations in choosing between retirement or a full delete of the sensitive data. In an embodiment, the agent 106 transfers logs of the tokenization job to a token server for maintaining an audit trail that provides a documented history of tokenization within an organization.

Figure 7:
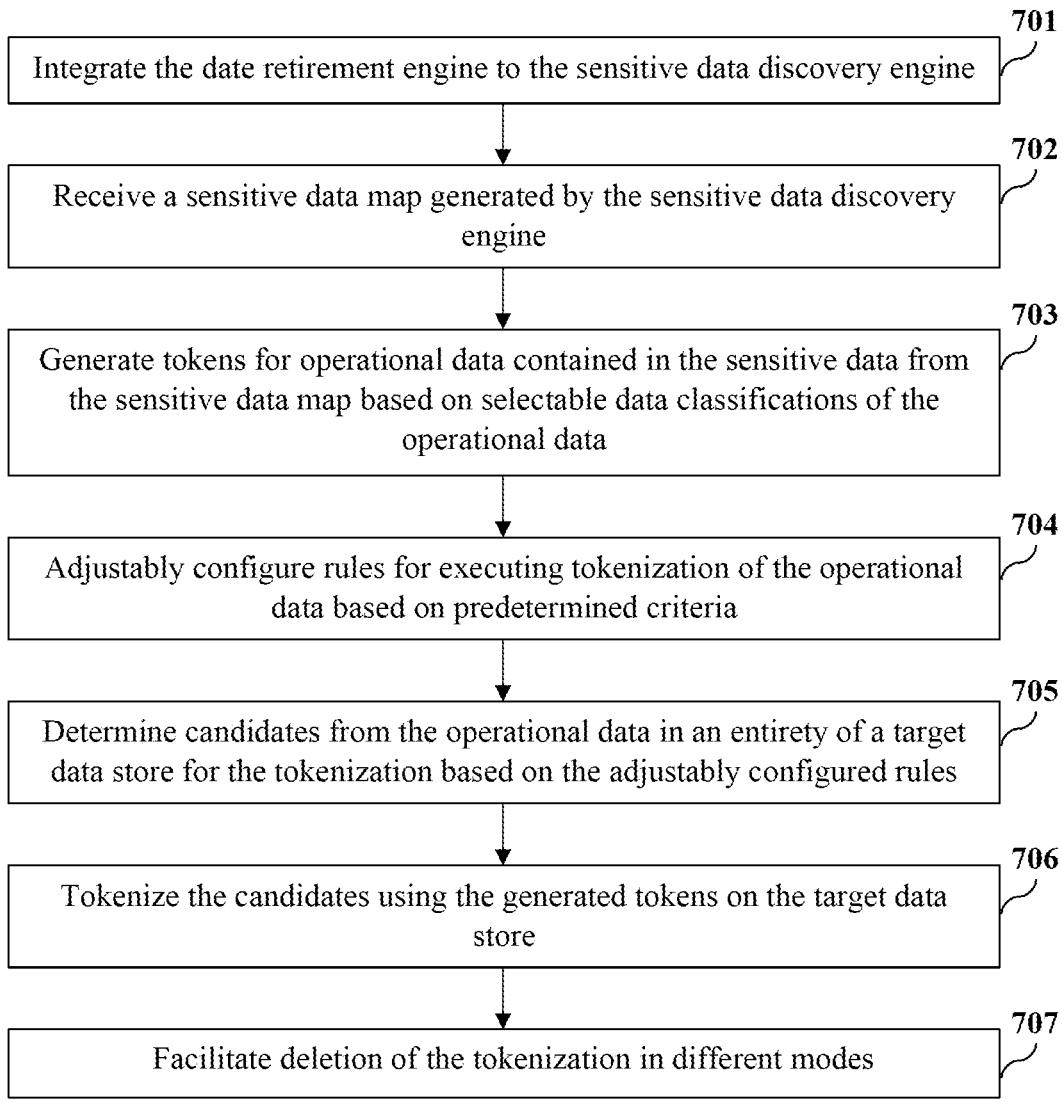
FIG. 7 illustrates a flowchart of a method for retiring sensitive data, according to an embodiment herein.

FIG. 7 illustrates a flowchart of a method for retiring sensitive data, according to an embodiment herein. The data retirement engine performs user-requested and/or driven inactive sensitive data retirement. In the method disclosed herein, the data retirement engine is integrated 701 to and in operable communication with the sensitive data discovery engine. The data retirement engine receives 702 a sensitive data map generated by the sensitive data discovery engine. The sensitive data map provides complete information of the discovery of the sensitive data and relationships present as disclosed in the detailed description of FIG. 1. The sensitive data map comprises locations of sensitive data of multiple data types or data classifications in multiple data stores as disclosed in the detailed description of FIG. 1. The data retirement engine generates 703 tokens for operational data contained in the sensitive data from the sensitive data map based on selectable data classifications of the operational data using one or more of multiple tokenizers configured to desensitize the sensitive data, while retaining transactional data. In an embodiment, each of the tokenizers implements, for example, any one of reversible cryptographic tokenization using an advanced encryption standard (AES), reversible cryptographic tokenization using a secure hash algorithm (SHA), and reversible non-cryptographic tokenization. In another embodiment, each of the tokenizers implements for example, any one of irreversible cryptographic authenticatable tokenization, irreversible cryptographic on-authenticatable tokenization, irreversible non-cryptographic authenticatable tokenization, irreversible non-cryptographic non-authenticatable tokenization, and reversible cryptographic tokenization.

The data retirement engine adjustably configures 704 rules, also referred to as "tokenization rules" or "retirement roles", for executing tokenization of the operational data based on predetermined criteria. The predetermined criteria comprise, for example, one or more of the selectable data classifications and a retirement time period. The data retirement engine 105 provides flexibility to address differences in data retention rules based on geographies and types of data. The rules configured in the data retirement engine 105 are defined to retire the inactive sensitive data. These rules are flexible and support a wide range of conditions that can be applied onto the roles. According to an embodiment herein, the data retirement engine creates entities for grouping and tokenizing the operational data based on the adjustably configured rules. The data retirement engine determines 705 candidates from the operational data in an entirety of a target data store for the tokenization based on the adjustably configured rules. The data retirement engine identifies the geographies for each candidate using, for example, nationality or geography available for that candidate in the data store. The data retirement engine uses nationality or geography to group the candidates into different geographies. For example, in the Oracle EBS application, tables such as PER_ASSIGNMENT tables store geographical details of an employee. The data retirement engine adds columns pertaining to geography from these tables to the configured rules to differentiate geographies. Furthermore, the data retirement engine uses data classifications, for example, national identifier, bank account, phone, names, address, etc., rendered by the sensitive data discovery engine for identifying different types of sensitive data that is present in the target data store. The sensitive data discovery engine allows flexible addition of any custom data classifications as required, based on which the sensitive data map is generated and rendered to the data retirement engine for initiating the data retirement process.

According to an embodiment herein, the data retirement engine 105 configures retirement policies as rules for tokenization and reidentification based on data classifications. For example, if some countries or geographies require names to be tokenized as part of the data retirement process and some other countries or geographies require names to be available but other sensitive data to be tokenized, the data retirement engine 105 configures one rule that includes the name data classification and another rule without a name data classification. According to another embodiment herein, the data retirement engine 105 configures retirement policies as rules for tokenization and reidentification based on a time period of retirement. The data retirement engine 105 allows configuration of an inactive period after which data should be tokenized. For example, the data retirement engine 105 configures a rule to retire inactive data that is older than one year and another rule to retire inactive data that is older than five years. Based on the geography, each country may have different days to retain inactive data, which is managed by the data retirement engine using the configured rules.

According to an embodiment herein, the data retirement engine 105 allows addition of an SQL statement, for example, a "where" condition during configuration of the rules for tokenization. For example, the data retirement engine 105 allows a system administrator to configure rules that are specific to different geographies and group candidates into different regions such as Asia, North America, Europe, etc., with each region having a different set of data classifications for retirement and a different retirement policy. For example, to retire sensitive data of only American nationals who have worked in the US, UK, or India regions, the data retirement engine 105 allows a system administrator to configure the condition 'select PERSON_ID from HR.PER_ALL_PEOPLE_F where NATIONALITY='AMERICAN' and BUSINESS_UNIT in ('UK', 'US', 'IN')' in the rules and/or use any SQL query to filter the candidates for retirement of inactive sensitive data.

After determining the candidates for the tokenization, the data retirement engine tokenizes the candidates using the generated tokens on the target data store. According to an embodiment herein, the data retirement engine tokenizes 706 the candidates with a token mapping table by implementing at least one of: reversible cryptographic tokenization using an advanced encryption standard, reversible cryptographic tokenization using a secure hash algorithm, and reversible non-cryptographic tokenization. According to an embodiment herein, the data retirement engine encrypts and stores a mapping of the candidates and the generated tokens in the token mapping table on a token server. The token mapping table is configured to allow prospective retrieval of inactive sensitive data. According to another embodiment herein, the data retirement engine tokenizes the candidates without a token mapping table by implementing at least one of: irreversible cryptographic authenticatable tokenization, irreversible cryptographic non-authenticatable tokenization, irreversible non-cryptographic authenticatable tokenization, irreversible non-cryptographic non-authenticatable tokenization, and reversible cryptographic tokenization.

The data retirement engine facilitates 707 The data retirement engine facilitates deletion of tokens in different modes. The different modes for the deletion of tokens comprise, for example, a soft delete mode and a hard delete mode. The soft delete mode is configured to archive the token mapping table that stores mapping information associated with mapping of the candidates to the generated tokens. According to an embodiment herein, to execute the soft delete mode, the data retirement engine receives a list of the candidates for which the mapping information is to be archived using the adjustably configured rules; and transfers the mapping information of the candidates in the received list from the token mapping table to an archive table. In the soft delete mode, the mapping information is deleted from the token mapping table. Furthermore, in the soft delete mode, the data retirement engine transfers the archive table to a secure location, from where the archive table is retrievable in response to a request for the reversal of the tokenization. In response to the request for the reversal of the tokenization, the data retirement engine transfers the mapping information of the candidates in the received list from the archive table to the token mapping table for restoration. The hard delete mode is configured to permanently delete the token mapping table. According to an embodiment herein, to execute the hard delete mode, the data retirement engine receives a list of the candidates for which the mapping information is to be deleted using the adjustably configured rules; and permanently and irreversibly deletes the mapping information from the to mapping table.

The data retirement engine provides organizations with the flexibility to "soft delete" or "hard delete" the token mapping table, which archives or deletes the token mapping table respectively. Archiving the token mapping table allows organizations to retrieve the mapping information when they need to access original data at a future date. The archival of tokens in the soft delete mode provides an extra layer of security for the tokenized data, as an additional step is required to gain access to the mapping information in case of handling any reversal requests. The archival of tokens allows reversal of the tokenization, when requested, to restore the original data with a higher level of security compared to the non-archived tokens. In the hard delete mode, the data retirement engine permanently deletes the mapping information between the original data and the tokens. In both the soft delete mode and the hard delete mode, the data retirement engine stores the token mapping table in a protected form to disallow an unauthorized person to obtain the correspondence between the original data and the tokens.

Figure 8:
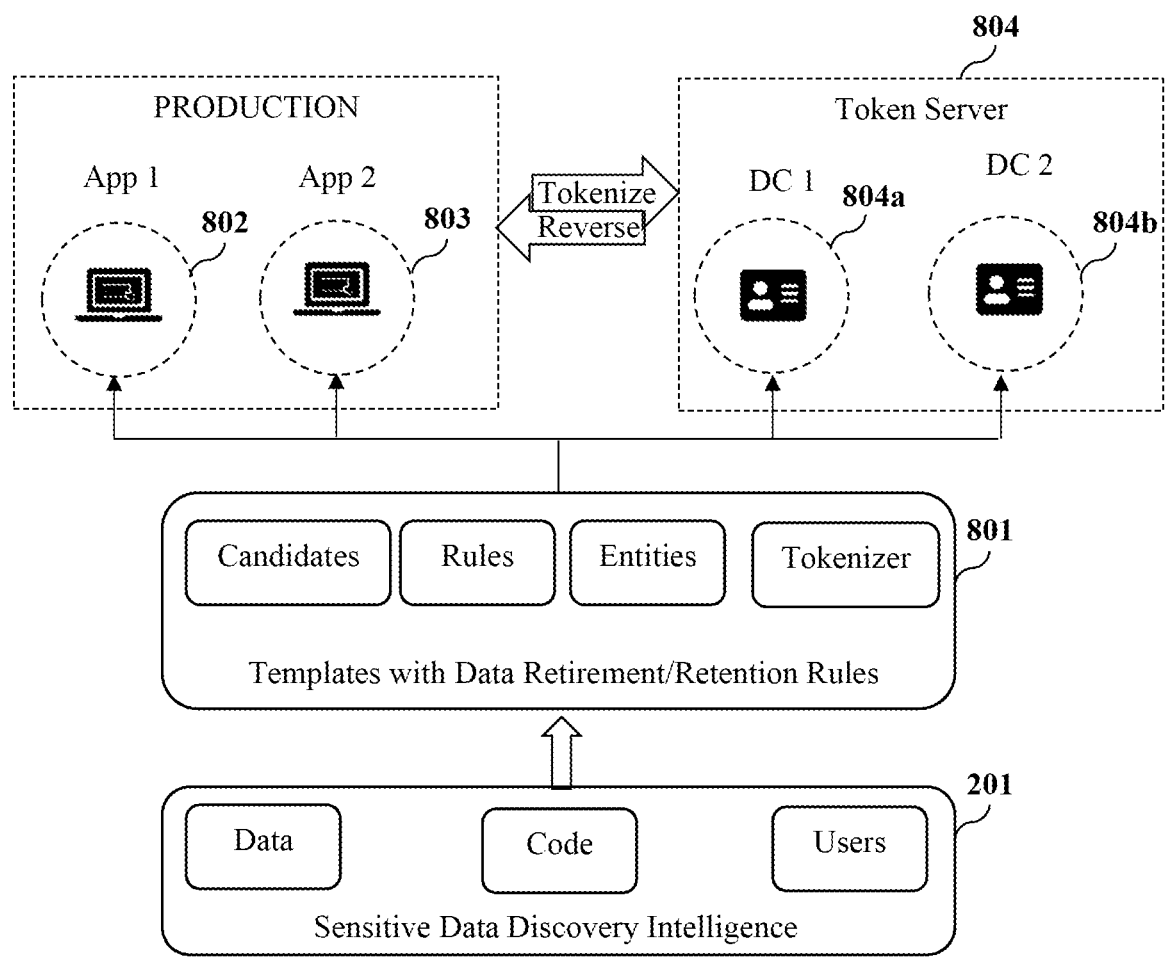
FIG. 8 illustrates a block diagram showing a usage of sensitive data discovery intelligence and corresponding templates for retiring sensitive data, according to an embodiment herein.

FIG. 8 illustrates a block diagram showing a usage of sensitive data discovery intelligence 201 and corresponding templates 801 for retiring sensitive data, according to an embodiment herein. The sensitive data discovery engine 102 of the integrated platform 101 shown in FIG. 1, generates the sensitive data discovery intelligence 201 and templates 801 with data retirement or retention rides as disclosed in the detailed description of FIG. 1. According to an embodiment herein, the templates 801 provide information on candidates, retirement rules, entities, and tokenizers for tokenizing the sensitive data. According to an embodiment herein, the data retirement engine 105 of the integrated platform 101 shown in FIG. 1, tokenizes the inactive sensitive data instead of removing the inactive sensitive data. The data retirement engine 105 configures a token format to suit a unique data classification. For tokenization with a vault, the data retirement engine 105 encrypts and stores a token-to-original data mapping in a token server 804. According to an embodiment herein, the data retirement engine 105 removes the token-to-original data mapping from the token server 804. The data retirement engine 105 executes data retirement without changes to the structures of the locations of the sensitive data, for example, schemas, tables, etc., and without changing processes involved or performance of the data sources. Using the templates 701, in an example, the data retirement engine 105 retires or tokenizes inactive sensitive data from applications 802 and 803 in a production environment and stores the token-to-data mapping in data centers 804a and 804b of the token server 804 respectively as illustrated in FIG. 8. Furthermore, in an example, the data retirement engine 105 reverses the tokenization.

Figure 9:
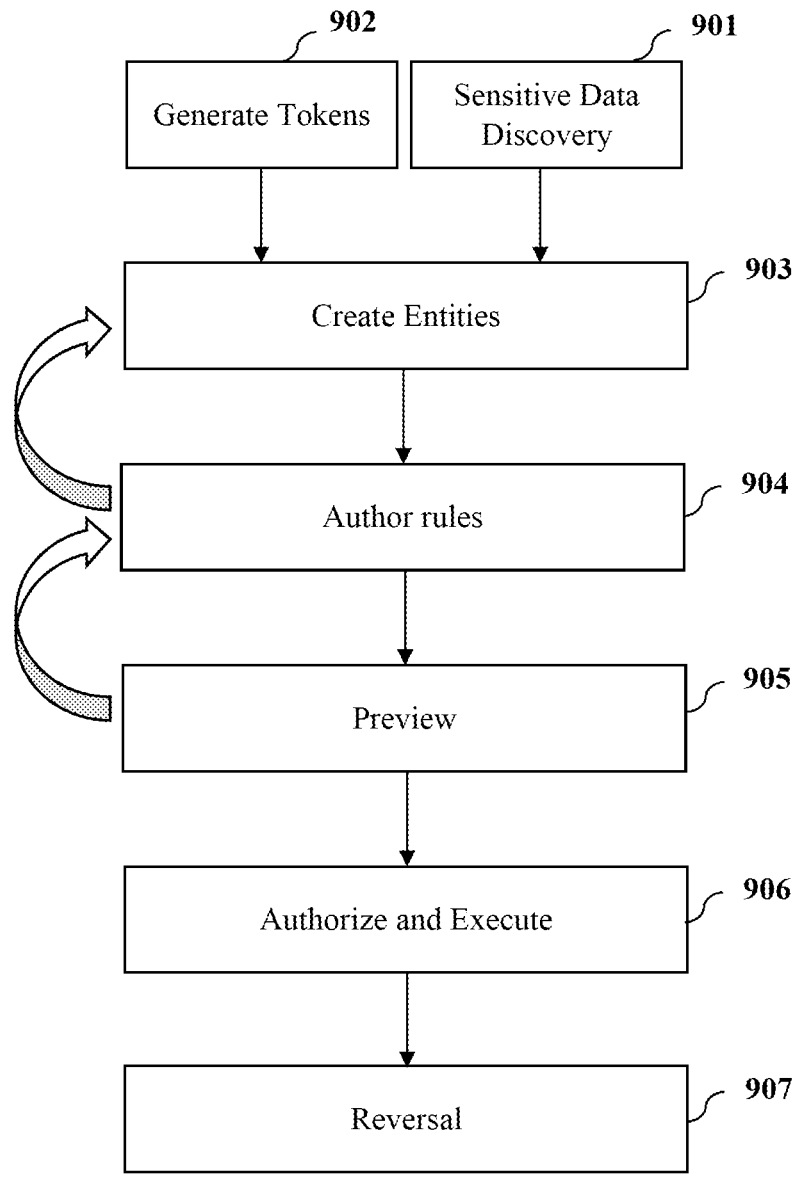
FIG. 9 illustrates a flowchart of an exemplary implementation of the method for retiring sensitive data, according to an embodiment herein.

FIG. 9 illustrates a flowchart of an exemplary implementation of the method for retiring sensitive data, according to an embodiment herein. In the exemplary implementation of the method disclosed herein, the sensitive data discovery engine performs a complete discovery 901 of sensitive data to identify all locations of sensitive data across multiple data stores. The data retirement engine generates 902 tokens for operational data contained in master data tables of a target data store as a validation step. According to an embodiment herein, the data retirement engine generates tokens one at a time. According to another embodiment herein, the data retirement engine automates the generation of the tokens. The token generation can be done one at a time or it cap be automated as well. The data retirement engine allows creation 903 of multiple entities, for example, employees, customers, vendors, etc., for tokenizing different groups of user data. The data retirement engine also allows authoring 904 of configurable rules, for example, based on "where" clauses, or complex SQL statements, or a retention period. A user, for example, a system administrator, authors rules, for example, "Remove employee data of all employees who are not in employment over 5 years", via a graphical user interface (GUI) provided by the data retirement engine. The data retirement engine determines candidates from the operational data in the master data tables for the tokenization based on the configured rules. The data retirement engine renders a preview 905 of the candidates to ensure the correct candidates are selected for tokenization and to allow adjustment of the rules if required. On receiving a confirmation of the candidates for tokenization, the data retirement engine freezes the final set of candidates and authorizes the execution 906 of tokenization of the candidates. The data retirement engine executes the tokenization process on the agent deployed on the target data store. The execution time depends on the number of candidates. Subsequent runs performed periodically consume less time. If detokenization of the operational data is required, the data retirement engine facilitates a flexible deletion 907 of the tokens in a soft deletion mode as disclosed in the detailed descriptions of FIG. 7 and FIG. 14. According to an embodiment herein, the data retirement engine allows adjustment of the created entities and the tokenization process based on validation results rendered by the data retirement engine.

FIG. 10 exemplarily illustrates a table representation of characteristics of different tokenizers executed by the data retirement engine for tokenizing sensitive data, according to an embodiment herein. The data retirement engine tokenizes and removes sensitive data without removing transactional data, thereby ensuring business value associated with the sensitive data is retained. The data retirement engine uses multiple tokenizers referenced, for example, as T1, T2, T3, T4, T5, T6, T7, and T8 in FIG. 10, for tokenizing the sensitive data. Tokenizer T1 performs reversible cryptographic tokenization with a vault or a token mapping table using an advanced encryption standard (AES). Tokenizer T1 generates tokens from the sensitive data using an AES function and then stores the sensitive data in a lookup table along with their corresponding tokens. Tokenizer T2 performs reversible cryptographic tokenization with a vault or a token mapping table using a secure hash algorithm (SHA). Tokenizer T2 generates tokens from the sensitive data using an SHA function and then stores the sensitive data in a lookup table along with their corresponding token. Tokenizer T3 performs reversible non-cryptographic tokenization with a vault or a token mapping table. Tokenizer T3 generates tokens from the sensitive data using non-cryptographic pseudorandom functions and then stores the sensitive data in a lookup table along with their corresponding token. Tokenizer T4 performs irreversible cryptographic authenticatable tokenization without a vault or a token mapping table. Tokenizer T4 generates an irreversible cryptographic authenticatable token mathematically through a one-way function, for example, an SHA function, that is configured to verify that a given sensitive data element was used but cannot be reversed to detokenize the sensitive data. Tokenizer T5 performs irreversible cryptographic non-authenticatable tokenization without a vault or a token mapping table. Tokenizer T5 generates an irreversible cryptographic non-authenticatable token mathematically through a one-way function, for example, an SHA function, from noisy sensitive data comprising sensitive data and random noise, which is not verifiable or de-tokenizable. Tokenizer T6 performs irreversible non-cryptographic authenticatable tokenization without a vault or a token mapping table. Tokenizer T6 generates an irreversible non-cryptographic authenticatable token mathematically through a one-way non-cryptographic pseudorandom function configured to be used to verify that a given sensitive data element was used but cannot be reversed to detokenize the sensitive data. Tokenizer T7 performs irreversible non-cryptographic non-authenticatable tokenization without a vault or a token mapping table. Tokenizer T7 generates an irreversible non-cryptographic, non-authenticatable token mathematically through a one-way non-cryptographic pseudorandom function from noisy sensitive data, which is not verifiable or detokenizable. Tokenizer T8 performs reversible cryptographic tokenization without a vault or a token mapping table. Tokenizer T8 generates a reversible cryptographic token mathematically from the sensitive data using a cryptographic encryption function, for example, an AES function. Tokenizer T8 operates with an encryption key management system for generating and managing an encryption key used for detokenizing the sensitive data.

FIGS. 11A-11B exemplarily illustrate tabular representations showing a retirement of sensitive data executed by the data retirement engine, according to an embodiment herein. Consider an example where the data retirement engine performs a retirement of sensitive data in a target data store, for example, a table, as exemplarily illustrated in FIG. 11A. In this example, a user, for example, a system administrator, configures a rule to dispose sensitive data of employees whose end date of employment with an organization is earlier than 2011. According to an embodiment herein, the data retirement engine tokenizes the sensitive data without removing the sensitive data. The system administrator configures a token format according to a unique data classification, for example, national identifier. As exemplarily illustrated in FIG. 11B, the data retirement engine tokenizes the sensitive data, for example, the national identifiers, of employees who left employment with the organization earlier than 2011. For example, the data retirement engine tokenizes the national identifier "654-33-6511" of Kerry Tories illustrated in FIG. 11A into "N00000000000000009532" as illustrated in FIG. 11B. The data retirement engine 105 stores the token-to-original data mapping in a token mapping table on a token server. According to an embodiment herein, the data retirement engine removes the token-to-original data mapping from the token server FIGS. 12A-12C exemplarily illustrate tabular representations showing tokenization and reversal of tokenization of sensitive data executed by the data retirement engine, according to an embodiment herein. Consider an example where a system administrator of an organization issues a request to the data retirement engine on an agent deployed in an Oracle EBS application for retiring sensitive data, for example, first name, last name, social security number, and bank account number of inactive employees who have left the organization from the North America region more than five years ago, and for retiring sensitive data, for example, social security number and bank account number of inactive employees who have left the organization from the Asia region more than ten years ago. The sensitive data discovery engine integrated to the data retirement engine executes a sensitive data discovery process for data classifications, namely, first name, last name, social security number, and bank account number. The data retirement engine generates tokens for a predefined master data tables in a database of the Oracle EBS application. The step of token generation creates a token mapping table with the original data from the master data tables and the corresponding tokens. The data retirement engine generates tokens for sensitive data that is not present in the master data tables during runtime. The data retirement engine renders a user interface to allow the system administrator to create an entity, for example, with PERSON_ID as a connection column and the employee last date of work as a driver column. The data retirement engine applies rules configured by the system administrator on the connection column and the driver column from the database. Since the employee last date of work captures the date of resignation, this date allows the data retirement engine to accurately pick the inactive employee data from the database.

The data retirement engine renders a user interface to allow the system administrator to author and create rules mapped to the entity created in the previous step. For example, based on inputs received from the system administrator, the data retirement engine configures a Rule 1 that caters to the North America region covering the data classifications, namely, first name, last name, social security number, and bank account number, and retiring sensitive data older than five years; and a Rule 2 that caters to the Asia region covering the data classifications, namely, social security number and bank account number, and retiring sensitive data older than ten years. The data retirement engine renders a condition section in the user interface to allow the system administrator to configure a "where" condition in the rules for differentiating the region to which the inactive employee belonged and any other SQL condition.

The data retirement engine determines candidates from the master data tables for the tokenization based on the configured rules. The data retirement engine renders a preview of the list of candidates that are eligible for retirement to the system administrator via a user interface to ensure the correct candidates are selected for tokenization and to allow adjustment of the rules if required. The data retirement engine allows the system administrator to download the list of candidates as a report for use in compliance. Based on the result set, the data retirement engine allows adjustments of the rules to meet the request for retirement. The data retirement engine allows the system administrator to approve the list of candidates list, that is, the list of ex-employees whose data will be retired, via the user interface using a freeze option and executes tokenization of the approved list. Inactive sensitive data that is in scope for tokenization is exemplarily illustrated in FIG. 12A. For example, for an employee with PERSON_ID=1245, the original data shows first name as "John", last name as "Taylor", email address as "John.Taylor@localhost.com", social security number as "909-03-4642", and bank account number as "909822349474" in the database as exemplarily illustrated in FIG. 12A. According to an embodiment herein, the data retirement engine hosted on an application server monitors the tokenization process. Tokenized data obtained after tokenization by the data retirement engine is exemplarily illustrated in FIG. 12B. For example, for the employee with PERSON_ID=1245, the tokenized data shows first name as "J~~09", last name as "T12345", email address as "J~~92459864@iretire.com", social security number as "000-00-0123", and bank account number as "500000124241" in the database as exemplarily illustrated in FIG. 12B. After the sensitive data of the inactive employees is retired, if there is a legal use case or a business use case to restore the tokenized data to the original data, the data retirement engine facilitates a flexible reversal of the tokenization. For example, the data retirement engine facilitates a flexible reversal of the tokenization if some employees are rehired and their original data needs to be restored. Reversed data obtained after reversal of the tokenization is exemplarily illustrated in FIG. 12C. For example, for the employee with PERSON_ID=1245, the original data. Shows first name as "John", last name as "Taylor", email address as "John.Taylor@localhost.com", social security number as "909-03-4642", and bank account number as "909822349474" in the database as exemplarily illustrated in FIG. 12C.

FIG. 13 exemplarily illustrates a token mapping table comprising mapping information associated with mapping of sensitive data to tokens, according to an embodiment herein. In the example disclosed in the detailed description of FIGS. 12A-12C, the data retirement engine generates a token mapping table as exemplarily illustrated in FIG. 13 for storing a mapping of the candidates and the generated tokens. The token mapping table is configured to allow prospective retrieval of inactive sensitive data. The highlighted columns in the token mapping table exemplarily illustrated in FIG. 13 show the original value of the sensitive data and the corresponding token. The data classification is represented by a "DC_ID" column in the token mapping table. Other ID columns of the token mapping table in FIG. 13 represent identifiers to associate the token mapping table with the database.

Figure 14:
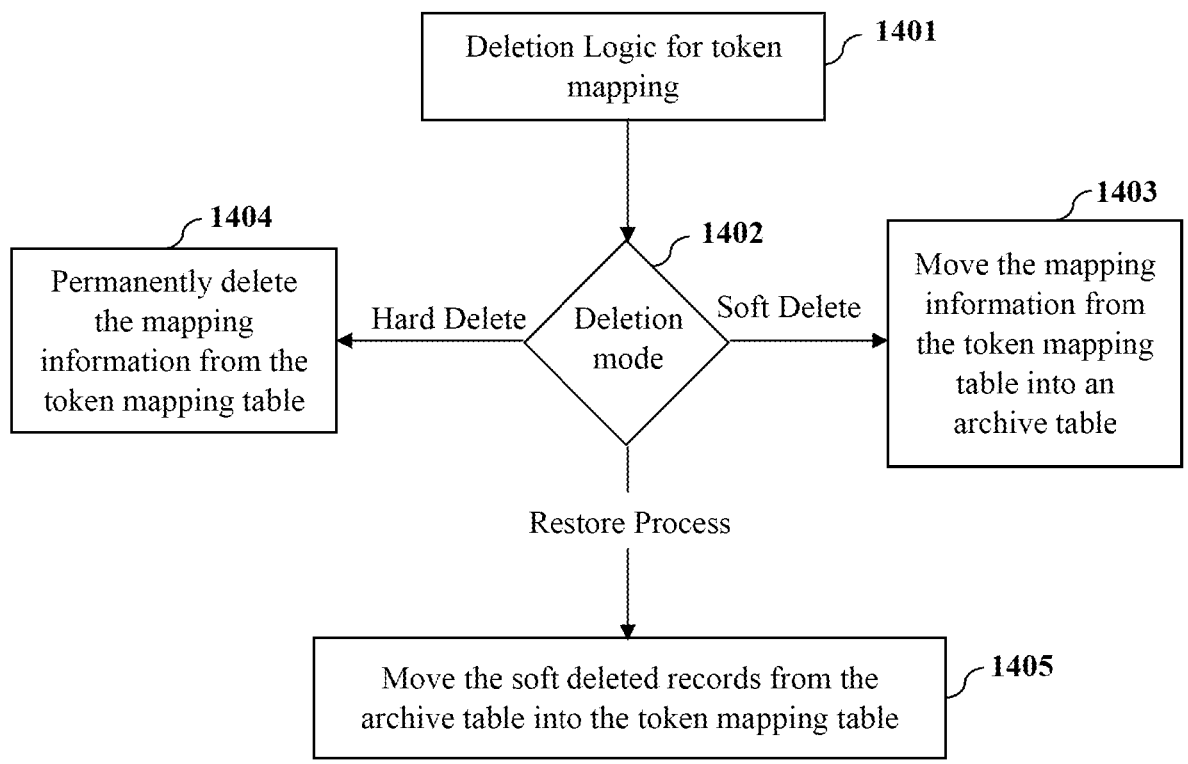
FIG. 14 illustrates a flowchart of the method for deletion of tokens in different modes, according to an embodiment herein.

FIG. 14 illustrates a flowchart of the method for deleting tokens different modes, according to an embodiment herein. The data retirement engine implements deletion logic 1401 for token mapping. The data retirement engine facilitates a deletion of the tokens in different modes. The data retirement engine allows a system administrator to select a deletion mode 1402, for example, from a soft delete mode and a hard delete mode via a user interface. If the system administrator selects the soft delete mode, the data retirement engine moves 1403 the mapping information from the token mapping table into an archive table as disclosed in the detailed description of FIG. 7. If the system administrator selects the hard delete mode, the data retirement engine permanently deletes 1404 the mapping information from the token mapping table as disclosed in the detailed description of FIG. 7. In the soft delete mode, if the system administrator issues a request to restore the original data, the data retirement engine moves 1405 the soft deleted records from the archive table into the token mapping table for restoration.

Figure 15A:
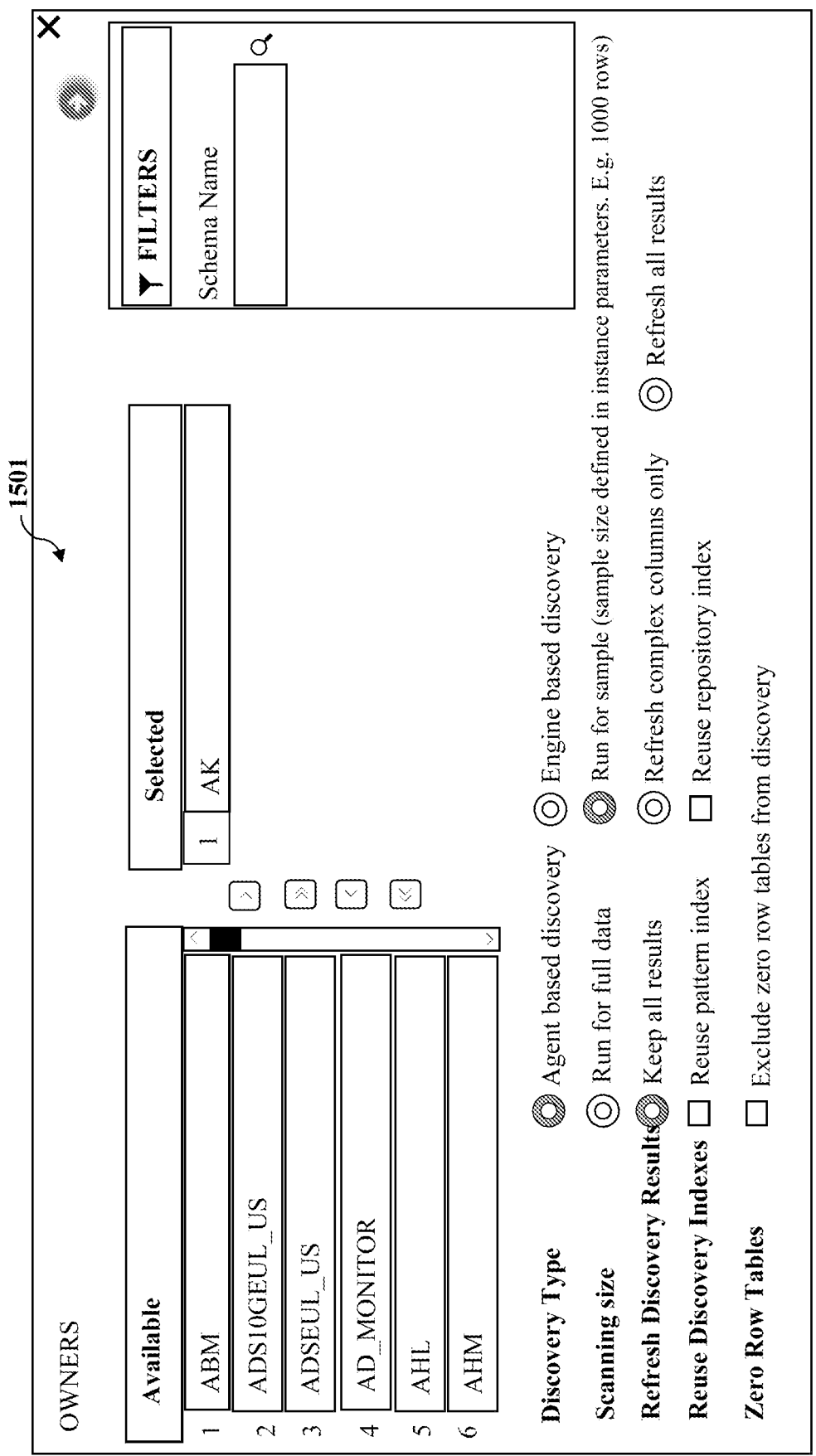
FIGS. 15A-15P exemplarily illustrate screenshots of graphical user interfaces rendered by the system for discovering and retiring sensitive data, according to an embodiment herein.
Figure 15C:
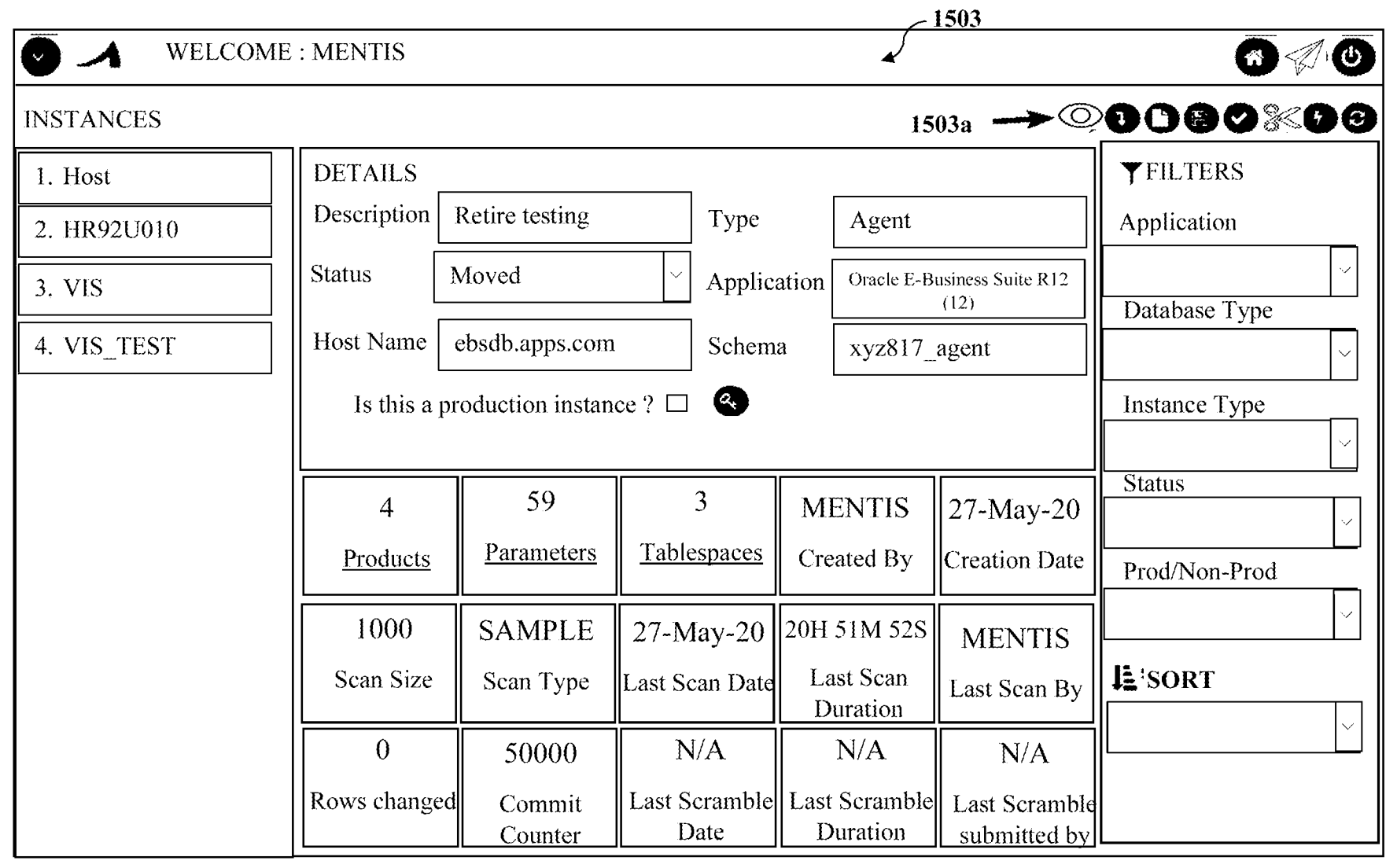
Figure 15G:
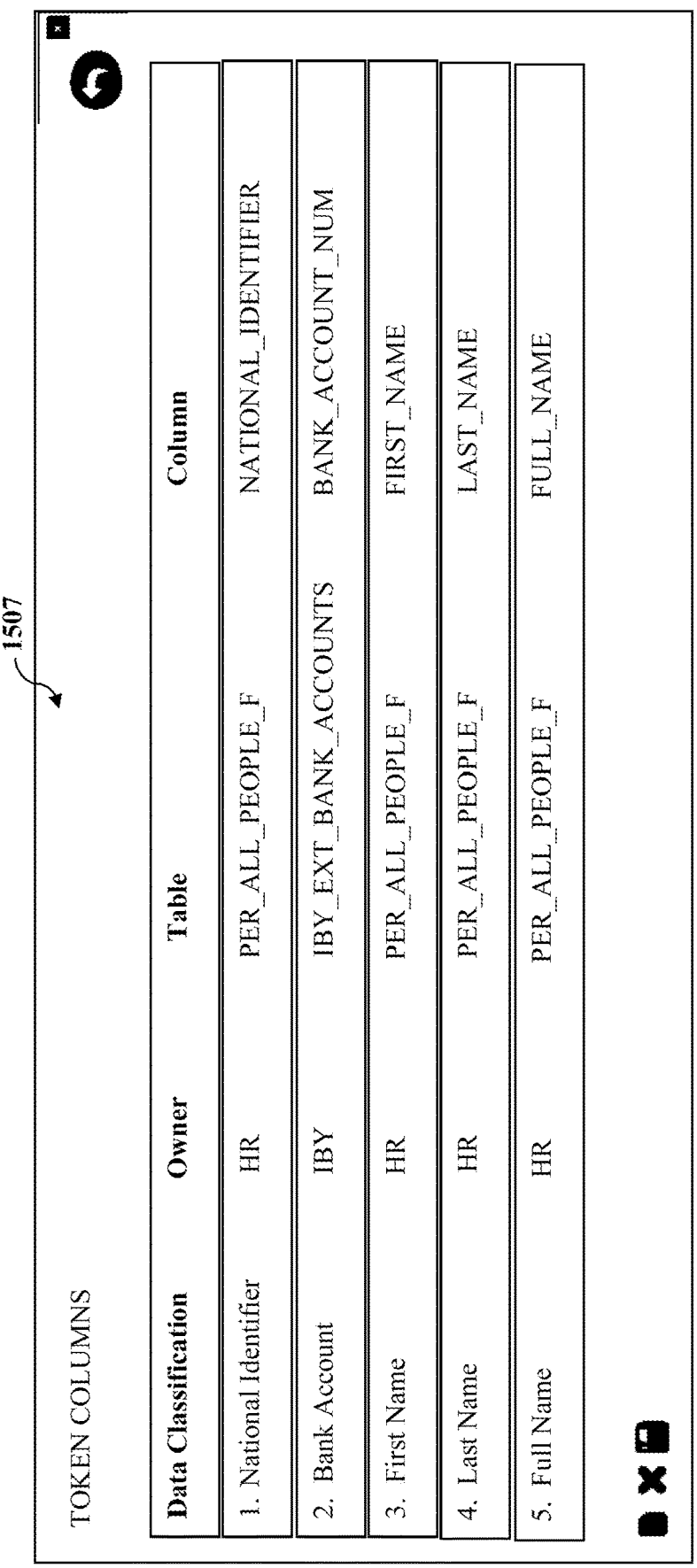
Figure 15H:
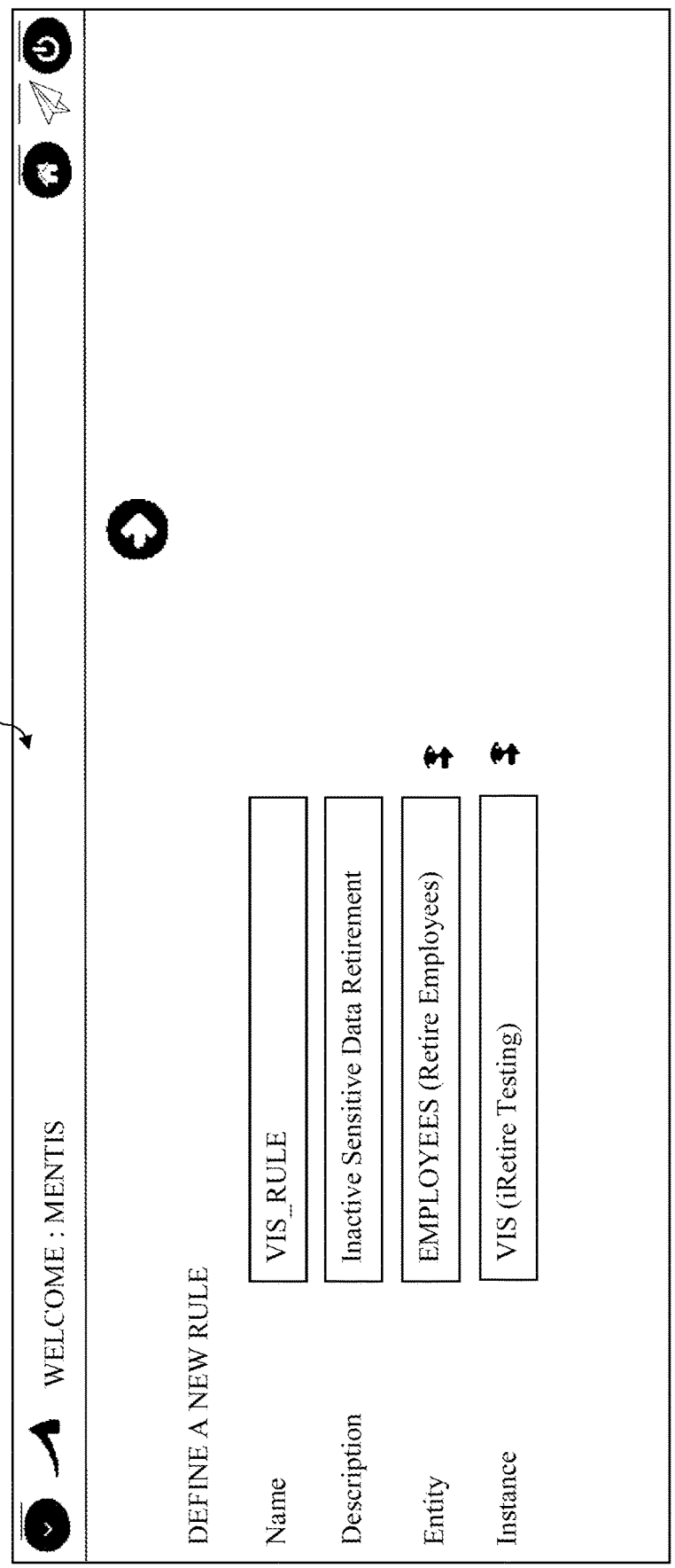
Figure 15I:
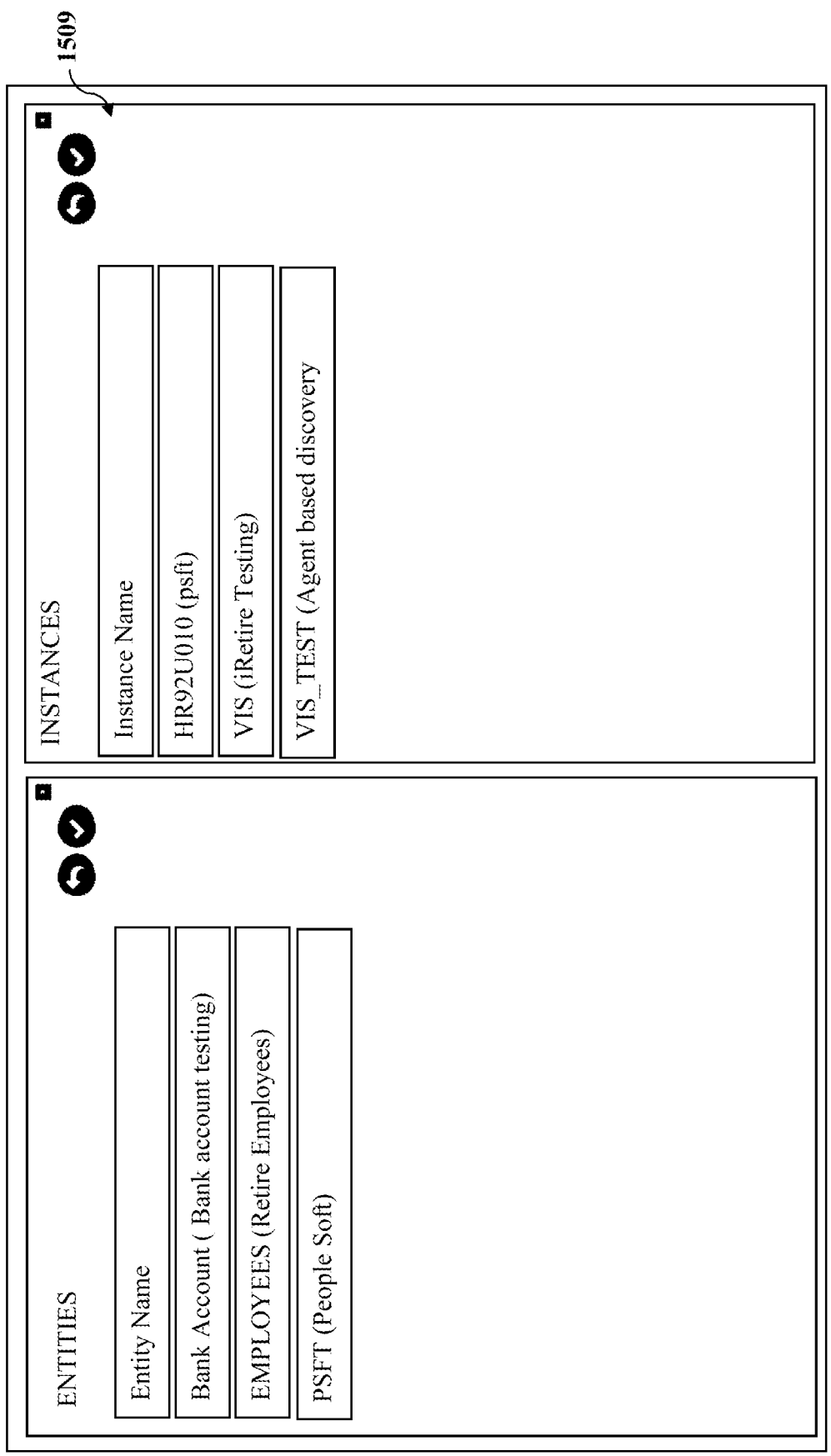
Figure 15J:
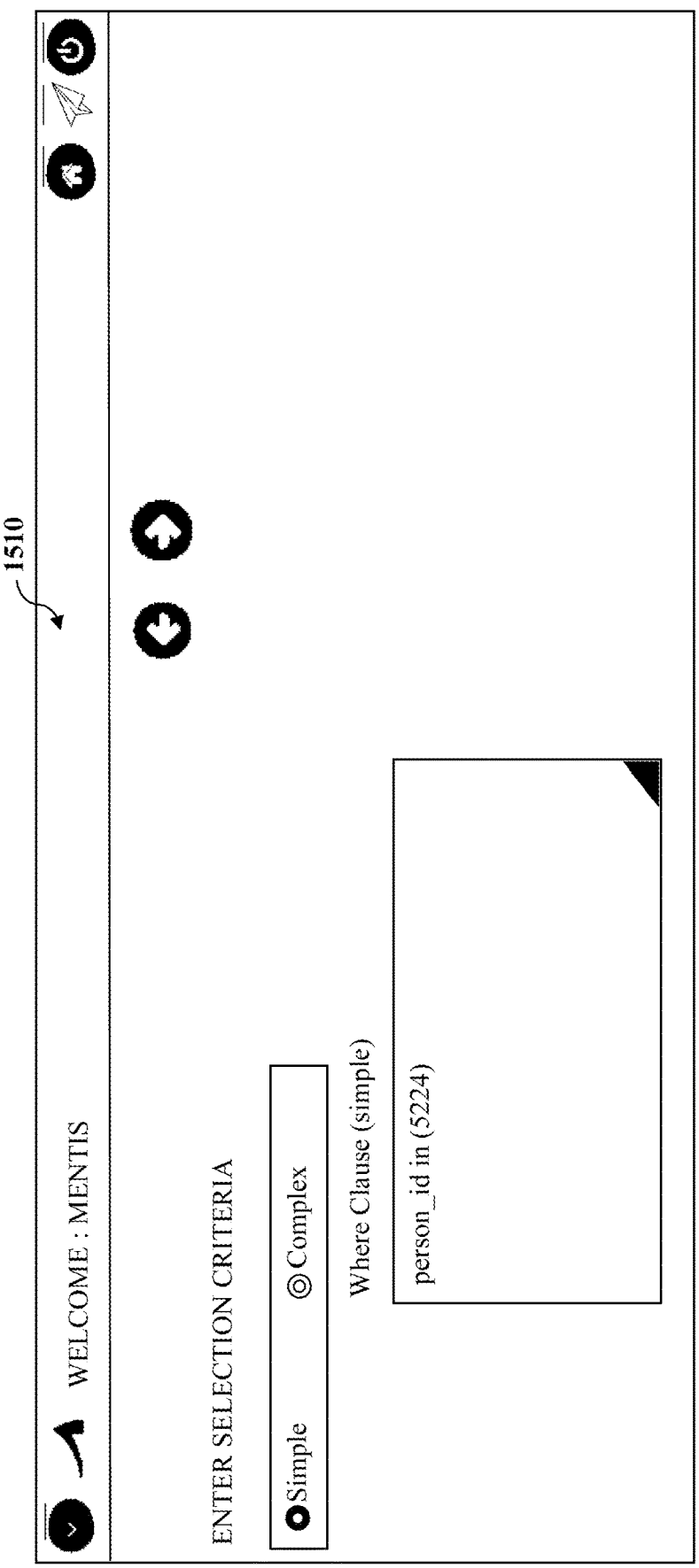
Figure 15P:
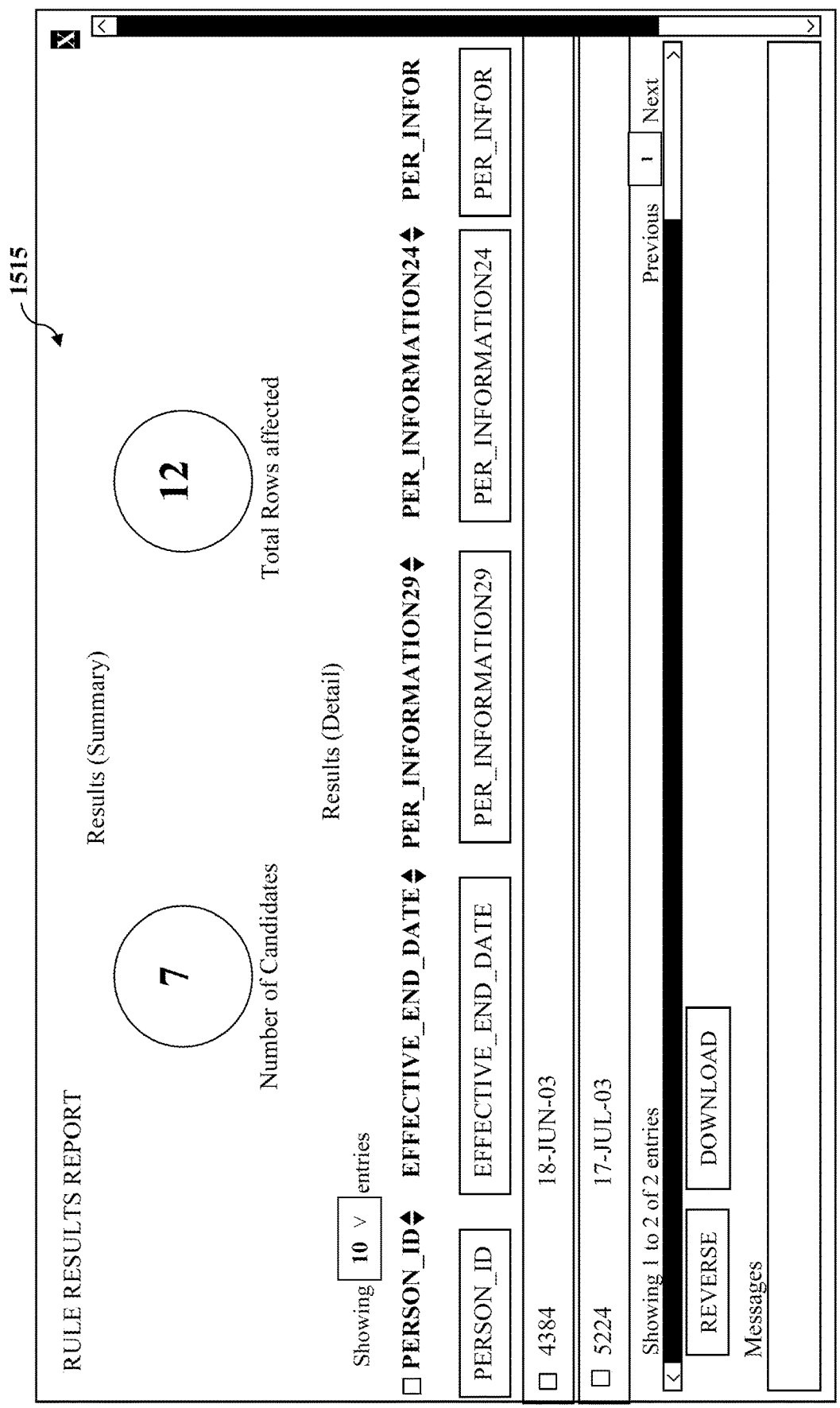

FIGS. 15A-15P exemplarily illustrate screenshots of graphical user interfaces (GUIs) rendered by the system for discovering and retiring sensitive data, according to an embodiment herein. The system disclosed herein renders a GUI 1501 as exemplarily illustrated in FIG. 15A for allowing a user, for example, a system administrator, to select a schema on which a sensitive data discovery process is to be executed by the sensitive data discovery engine. The GUI 1501 displays options for selecting an agent-based discovery process or an engine-based discovery process. The GUI 1501 also displays options for selecting a scanning size, refreshing discovery results, reusing discovery indexes, excluding tables from the discovery process, etc. The system disclosed herein renders a GUI 1502 as exemplarily illustrated in FIG. 15B for allowing the system administrator to select data classifications or different types of sensitive data, for example, credit card information, date of birth, email addresses, first name, etc., to be retired. The system disclosed herein renders a GUI 1503 comprising an instance screen as exemplarily illustrated in FIG. 15C for triggering the generation of tokens. When the system administrator clicks on an eye icon 1503a on the GUI 1503 for a particular database instance, the data retirement engine triggers the generation of tokens based on the data classifications selected via the GUI 1502 exemplarily illustrated in FIG. 15B. The data retirement engine displays different data classifications that can be selected to generate tokens on a GUI 1504 as exemplarily illustrated in FIG. 15D. The system maintains a predefined master data table for each data classification. The system administrator defines the driver column and the connection column during creation of entities via a GUI 1505 as exemplarily illustrated in FIG. 15E. The connection column is a unique column in the database that is used to identify a person. For example, PERSON_ID is used as the connection column in the database for the Oracle EBS solution as exemplarily illustrated in the GUI 1506 of FIG. 15F. The driver column is a column that is used to select the inactive employees based on their termination date available in the database as exemplarily illustrated in the GUI 1506 of FIG. 15F.

The system disclosed herein renders a GUI 1507 as exemplarily illustrated in FIG. 15G for allowing the system administrator to configure various data classifications that need to be tokenized as part of a created entity. FIG. 15H exemplarily illustrates a GUI 1508 for configuring rules that are mapped to the created entity and instance. The rules define the conditions that are applied during the retirement process. FIG. 15I exemplarily illustrates a GUI 1509 rendered by the system for allowing the system administrator to select an instance and an entity for the configured rules. FIG. 15J exemplarily illustrates a GUI 1510 rendered by the system for allowing the system administrator to configure a "where" condition for a rule. The data retirement engine allows the system administrator to configure either a simple where clause or a complex where clause on the GUI 1510. FIG. 15K exemplarily illustrates a GUI 1511 rendered by the system for allowing the system administrator to include either all data classifications or exclude some of the data classifications that were defined in the entity for the rules.

FIG. 15L exemplarily illustrates a GUI 1512 rendered by the system for allowing the system administrator to enter a time frame for archival and removal of the sensitive data. The data retirement engine calculates the number of days or the interval after which inactive data needs to be retired. For example, if the requirement is to tokenize data that is inactive for ten years, the system administrator enters 3650 days on the GUI 1512. FIGS. 15M-15N exemplarily illustrate a GUI 1513 comprising a preview screen rendered by the system that displays the eligible candidates to be part of the tokenization process. For example, in the Oracle human resources (HR) system, the GUI 1513 displays a unique PERSON_ID 5224 of an employee as a candidate for tokenization of all his or her associated sensitive data records. After the preview results are verified by the system administrator, the system administrator may freeze the rule and proceed to execute the tokenization process via the GUI 1513 as exemplarily illustrated in FIGS. 15M-15N. When the system administrator clicks the freeze and execute options provided on the GUI 1513, the data retirement engine starts an update process for tokenization. After the tokenization is executed by the data retirement engine, the system administrator may reverse any candidate or entire rule via a reversal section on a GUI 1514 as exemplarily illustrated in FIG. 15O. The GUI 1514 provides an option to select only a particular candidate or all candidates for reversal based on a user requirement. When the system administrator clicks on a report option 1514a provided on the GUI 1514, the data retirement engine generates and displays a report comprising specific candidates that may be selected for the reversal process on a GUI 1515 as exemplarily illustrated in FIG. 15P.

Figure 16:
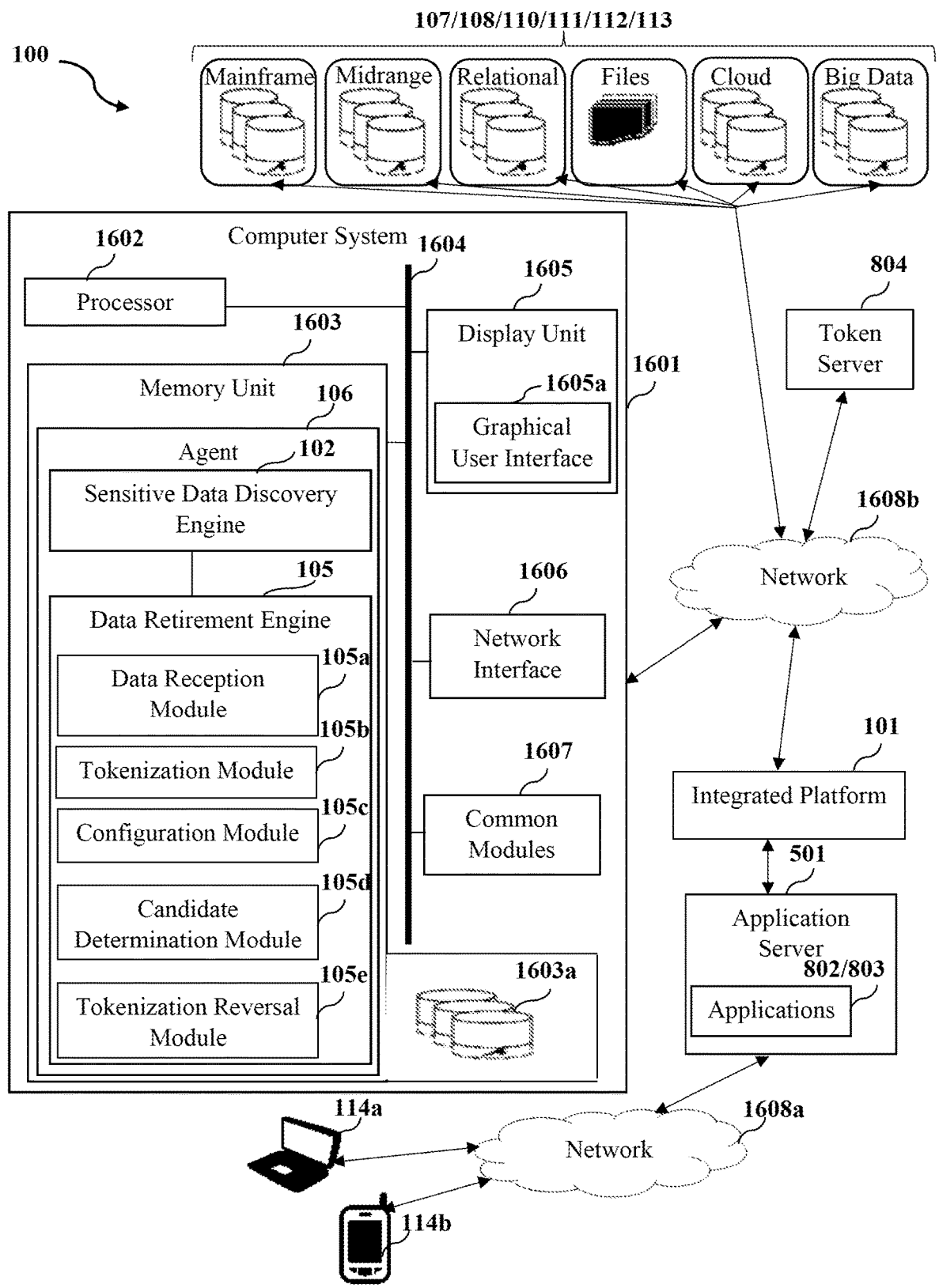
FIG. 16 illustrates an architectural block diagram of an exemplary implementation of the system for retiring sensitive data, according to an embodiment herein.

FIG. 16 illustrates an architectural block diagram of an exemplary implementation of the system 100 for retiring sensitive data, according to an embodiment herein. The system 100 disclosed herein comprises the integrated platform 101 that communicates with multiple similar and variant data sources or data stores, for example, mainframes 112, midrange systems, relational databases 107 and 108, files 110, cloud data sources 113, big data sources 111, structured data sources, unstructured data sources, etc., and applications 802 and 803 hosted on an application server 501. According to an embodiment herein, the integrated platform 101 communicates with the data stores via a network 1608b, for example, a short-range network or a long-range network. The network 1608b is, for example, one of the internet, intranet, a wired network, a wireless network, a communication network that implements Bluetooth® of Bluetooth Sig. Inc., a network that implements of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

According to an embodiment herein, each data source, for example, 1603a, is implemented on a computer system 1601 as exemplarily illustrated in FIG. 16. The integrated platform 101 deploys rules and methods for integrating and managing security of sensitive data across a lifecycle of the sensitive data via an agent 106 deployed at each data source 1603a. According to an embodiment herein, there is a separate agent 106 or each of the data sources, for example, 1603a, 107, 108, 110, 111, 112, 113, etc. According to an embodiment herein, the agent 106 comprises the sensitive data discovery engine 102, the data retirement engine 105, and other modules such as the data anonymization engine 103 (not shown in FIG. 16), the data monitoring module 104 (not shown in FIG. 16) as disclosed in the US non-provisional patent application with application Ser. No. 16/656,341 filed on Oct. 17, 2019. According to an embodiment herein, agent connections made by the sensitive data discovery engine 102 and the data retirement engine 105 to the integrated platform 101 are non-persistent. The integrated platform 101 stores audit logs, the intelligence of the applications, rules, templates, discovery results, data classifications, etc., in one or more databases (not shown). The databases of the integrated platform 101 refer to any storage area or medium that is used for storing data and files. According to an embodiment herein, the databases of the integrated platform 101 are, for example, data stores, locations on file systems, external databases remotely accessible via the network 1608b, cloud-based databases implemented in a cloud computing environment, etc.

According to an embodiment herein, the computer system 1601 that hosts the data source 1603a is programmable using high-level computer programming languages. According to an embodiment herein, the computer system 1601 is implemented using programmed and purposeful hardware. According to an embodiment herein, the computer system 1601 and the integrated platform 101 are accessible to users, for example, through a broad spectrum of technologies and user devices such as laptops 114a, smart phones 114b, tablet computing devices, endpoint devices, etc., with access to a network 1608a, for example, the internet. As exemplarily illustrated in FIG. 16, the system 100 disclosed herein further comprises a non-transitory, computer-readable storage medium, for example, a memory unit 1603, deployed in the computer system 1601, for storing computer program instructions defined by the modules, for example, 102, 105, etc., in the agent 106. As used herein, "non-transitory, computer-readable storage medium" refers to all computer-readable media that contain and store computer programs and data. Examples of the computer-readable media comprise hard drives, solid state drives, optical, discs or magnetic disks, memory chips, a read-only memory (ROM), a register memory, a processor cache, a random-access memory (RAM), etc.

The system 100 disclosed herein further comprises a processor 1602 operably and communicatively coupled to the memory unit 1603 for executing the computer program instructions defined by the modules, for example, 102, 105, etc., in the agent 106. The memory unit 1603 is used for storing program instructions, applications, and data. The memory unit 1603 is, for example, a random-access memory (RAM) or another type of dynamic storage device that stores information and instructions for execution by the processor 1602. The memory unit 1603 also stores temporary variables and other intermediate information used during execution of the instructions by the processor 1602. The computer system 1601 further comprises read only memories (ROMs) or other types of static storage devices that store static information and instructions for execution by the processor 1602. According to an embodiment herein, the agent 106 comprising one or more of the modules, for example, 102, 105, etc., is stored in the memory unit 1603.

The modules, for example, 102, 105, etc., of the agent 106, when loaded into the memory unit 506 and executed by the processors 502, transform the computer system 1601 into a specially-programmed, special purpose computing device configured to implement the functionality disclosed herein. The processor 1602 is configured to execute the computer program instructions defined by the modules, for example, 102, 105, etc., of the agent 106 for integrating and managing security of sensitive data across a lifecycle of the sensitive data and for retiring sensitive data. The processor 1602 refers to any one or more microprocessors, central processing unit (CPU) devices, finite state machines, computers, microcontrollers, digital signal processors, logic, a logic device, a user circuit, an application specific integrated circuit (ASIC), a field-programmable gate array (FPGA), a chip, etc., or any combination thereof, capable of executing computer programs or a series of commands, instructions, or state transitions. According to an embodiment herein, the processor 1602 is implemented as a processor set comprising, for example, a programmed microprocessor and a math or graphics co-processor. The computer system 1601 is not limited to employing the processor 1602. According to an embodiment herein, the computer system 1601 employs controllers or microcontrollers. The processor 1602 executes the modules, for example, 102, 105, etc., of the agent 106.

As exemplarily illustrated in FIG. 16, the computer system 1601 further comprises a data bus 1604, a display unit 1605, a network interface 1606, and common modules 1607. The data bus 1604 permits communications between the modules, for example, 1602, 1603, 1605, 1606, and 1607 of the computer system 1601. The display unit 1605, via a graphical user interface (GUI) 1605*a*, displays information, display interfaces, user interface elements such as checkboxes, input text fields, etc., for example, for allowing a user such as a system administrator in an organization to define unique data classifications, select match operations, enter sequence numbers for the selected match operations for configuration of a scanning pathway by the sensitive data discovery engine 102, select templates, configure rules for retirement, create entities, select candidates for tokenization, etc. The computer system 1601 renders the GUI 1605*a* on the display unit 1605 for receiving inputs from the system administrator. The GUI 1605*a* comprises, for example, online web interfaces, web-based downloadable application interfaces, immobile-based downloadable application interfaces, etc.

The network interface 1606 enables connection of the computer system 1601 to the network 1608*b*. According to an embodiment herein, the network interface 1606 is provided as an interface card also referred to as a line card. The network interface 1606 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol/internet protocol, interfaces based on wireless communications technology such as satellite technology, radio frequency technology, near field communication, etc. The common modules 1607 of the computer system 1601 comprise, for example, input/output (I/O) controllers, input devices, output devices, fixed media drives such as hard drives, removable media drives for receiving removable media, etc. Computer applications and programs are used fix operating the computer system 1601. The programs are loaded onto fixed media drives and into the memory unit 1603 via the removable media drives. According to an embodiment herein, the computer applications and programs are loaded into the memory unit 1603 directly via the network 1608*b*.

According to an embodiment herein, the agent 106 comprising the sensitive data discovery engine 102 and the data retirement engine 105 is stored in the memory unit 1603 and executed by the processor 1602. The sensitive data discovery engine 102 and the data retirement engine 105 are disclosed above as software executed by the processor 1602. According to an embodiment herein, the modules, for example, 102, 105, etc., of the system 100 are implemented completely in hardware. According to another embodiment herein, the modules, for example, 102, 105, etc., of the system 100 disclosed herein are implemented by logic circuits to carry out their respective functions disclosed above. According to another embodiment herein, the system 100 is also implemented as a combination of hardware and software including; the integrated platform 101, the agent 106, and one or more processors, for example, 1602, that are used to implement the modules, for example, 102, 105, etc., of the system 100 disclosed herein.

According to an embodiment herein, the data retirement engine 105 comprises a data reception module 105*a*, a tokenization module 105*b*, a configuration module 105*c*, a candidate determination module 105*d*, and a tokenization reversal module 105*e*. The data reception module 105*a* receives a sensitive data map generated by the sensitive data discovery engine. The sensitive data map comprises locations of sensitive data of multiple data types or data classifications in multiple data stores as disclosed in the detailed description of FIG. 1. The tokenization module 105*b* generates tokens for operational data contained in the sensitive data from the sensitive data map based on selectable data classifications of the operational data using one or more of multiple tokenizers configured to desensitize the sensitive data, while retaining transactional data as disclosed in the detailed descriptions of FIG. 7 and FIG. 10.

The configuration module 105*c* adjustably configures rules, also referred to as "tokenization rules" or "retirement rules", for executing tokenization of the operational data based on predetermined criteria. The predetermined criteria comprise, for example, one or more of the selectable data classifications and a retirement time period. According to an embodiment herein, the configuration module 105*c* creates entities for grouping and tokenizing the operational data based on the adjustably configured rules. The candidate determination module 105*d* determines candidates from the operational data in an entirety of a target data store for the tokenization based on the adjustably configured rules. The tokenization module 105*b* tokenizes the candidates using the generated tokens on the target data store as disclosed in the detailed descriptions of FIG. 7 and FIG. 10. According to an embodiment herein, the tokenization module 105*b* encrypts and stores a mapping of the candidates and the generated tokens in a token mapping table on a token server 804. According to another embodiment herein, the data retirement engine tokenizes the candidates without a token mapping table. The token deletion module 105*e* facilitates deletion of the tokens in different modes, for example, a soft delete mode and a hard delete mode as disclosed in the detailed descriptions of FIG. 7 and FIG. 14. The processor 1602 retrieves instructions defined by the sensitive data discovery engine 102 and the data reception module 105*a*, the tokenization module 105*b*, the configuration module 105*c*, the candidate determination module 105*d*, and the tokenization reversal module 105*e* of the data retirement engine 105 from the memory unit 1603 for performing respective functions disclosed above.

For purposes of illustration, the detailed description refers to the modules, for example, 102, 105, etc., being run locally on a single computer system 1601; however the scope of the system 100 and the method disclosed herein is not limited to the modules, for example, 102, 105, etc., being run locally on a single computer system 1601 via the operating system and the processor 1602, but may be extended to run remotely over the network 1608*b* by employing a web browser and a remote server, a mobile phone, or other electronic devices. According to an embodiment herein, one or more portions of the system 100 disclosed herein are distributed across one or more computer systems (not shown) coupled to the network 1608*b*.

The non-transitory computer-readable storage medium disclosed herein stores computer program instructions executable by the processor 1602 for integrating and managing security of sensitive data across a lifecycle of the sensitive data and for retiring the sensitive data. The computer program instructions implement the processes of various embodiments disclosed above and perform additional steps that may be required and contemplated for retiring sensitive data. When the computer program instructions are executed by the processor 1602, the computer program instructions cause the processor 1602 to perform the steps of the method for retiring sensitive data as disclosed in the detailed descriptions of FIGS. 5-14. According to an embodiment herein, a single piece of computer program code comprising computer program instructions performs one or more steps of the method disclosed in the detailed descriptions of FIGS. 5-14. The processor 1602 retrieves these computer program instructions and executes them.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, according to an embodiment herein, refer to the hardware that is specifically configured to recognize and/or execute the computer program codes to be held on a non-transitory, computer-readable storage medium. According to an embodiment herein, the computer program codes comprising computer readable and executable instructions are implemented in any programming language, for example, C, C++, C#, Java®, JavaScript®, Fortran, Ruby, Perl®, Python®, Visual Basic®, hypertext pre-processor (PHP), Microsoft® .NET, Objective-C®, etc. According to an embodiment herein, other object-oriented, functional, scripting, and/or logical programming languages are also used. According to an embodiment herein, the computer program codes or software programs are stored on or in one or more mediums as object code. According to an embodiment herein, the term "Module" or "engine" or "unit" refers to the combination of the microcontroller and the non-transitory, computer-readable storage medium. Often module or engine boundaries that are illustrated as separate commonly vary and potentially overlap. For example, a module or an engine or a unit may share hardware, software, firmware, or a combination thereof while potentially retaining some independent hardware, software, or firmware. In various embodiments, a module or an engine or a unit includes any suitable logic.

The integrated platform 101 is industry agnostic and is deployable in multiple industries, for example, the financial service industry, the healthcare industry, the retail industry, etc. The integrated platform 101 is extendable for use by any enterprise in any industry intending to deploy data and application security products enterprise-wide. According to an embodiment herein, the applications of the system 100 and the method disclosed herein comprise, for example, cross-border data security, cloud security, data warehousing, sensitive data governance, regulatory compliance, enterprise resource planning, etc. For example, the sensitive data discovery engine 102 allows flagging of sensitive data in source systems of an organization and subsequent use of the sensitive data discover intelligence for data governance initiatives within the organization. The integrated platform 101 also provides the sensitive data discovery intelligence as an input for data mapping and data lineage. According to an embodiment herein, as data residency requirements drive organizations to implement cross-border data security solutions, the integrated platform 101 assists in the comprehensive discovery of sensitive data and the security of the sensitive data so that sensitive data does not leave the premises of the organizations. The integrated platform 101 discovers and protects sensitive data such that the sensitive data is retained at the premises of an organization to meet data residency requirements and cross border data security requirements. Furthermore, the integrated platform 101, expands the scope of data protection from on-premise to the cloud in applications such as data warehousing, risk elimination of sensitive data in a non-production environment, cross-border production and operations, etc. Furthermore, the sensitive data discovery engine 102 assists in enforcement of the general data protection regulation (GDPR) in the following articles: For example, in Article 4, the sensitive data discovery engine 102 assists in discovery of all personal data in a computer system; in Article 35, the sensitive data discovery engine 102 allows an organization to perform data privacy impact assessment that assesses the impact of processing on personal data using the templates; in Article 25, the sensitive data discovery engine 102 implements a data security mechanism by design and default using the templates; in Articles 33 and 34, the sensitive data discovery engine 102 identifies sensitive data to facilitate immediate notification of any breach to a supervisory authority and data subject as necessary: and in Article 15 that provides data subjects the right to access data, the sensitive data discovery engine 102 identifies and renders the locations of the sensitive data to provide the access. Similarly, the sensitive data discovery engine 102 assists in enforcing new regulations, for example, the California Consumer Privacy Act, passed after the GDPR.

According to an embodiment herein, for maintaining compliance with regulations using the integrated platform 101, an organization performs an inventory of all data sources in the environment, conducts a high-level assessment of the data sources to identify and prioritize the data sources that could potentially have sensitive data, runs the sensitive data discovery engine 102 against each data source to systematically locate all sensitive data in the data source, and collects the results and the sensitive data discovery intelligence for use in downstream data protection, governance and compliance reporting. The match operations, the scanning pathways, and the unique data classifications can be configured from within an existing application as per the use case.

The integrated platform 101 allows a close integration between the sensitive data discovery engine 102 and the data retirement engine 105. The data retirement engine 105 integrates seamlessly with the sensitive data discovery engine 102, thereby identifying all the sensitive data locations. The integration between the sensitive data discovery engine 102 and the data retirement engine 105 allows traversal of the entire data model and tokenization of sensitive data present in all locations in a target data store. With the rules configured, the data retirement engine 105 provides a convenient method to determine what data needs to be retired or deleted. The data retirement engine 102 provides the flexibility to select data classifications to be tokenized or deleted. Moreover, the data retirement engine 102 provides the flexibility to tokenize the inactive sensitive data. Tokenization of the sensitive data provides the flexibility to reverse the tokenization if required. Based on customer preferences and retention policies of an organization, the data retirement engine allows the token mapping table to be retained to maintain the reversibility or deleted to ensure a complete purge of the sensitive data from the system. The data retirement engine 102 also provides the flexibility to select between retirement and deletion of the inactive sensitive data. Furthermore, the data retirement engine 102 assists in the enablement of subject rights requests as mentioned in privacy regulations. The data retirement engine 102 assists organizations in responding to subject rights requests where data subjects enforce their right to know and right to access. The integration between the sensitive data discovery engine 102 and the data retirement engine 105 allows mapping of the entire data model, identification of the sensitive data present throughout a target data store, and mapping of the sensitive data to individuals. Furthermore, the data retirement engine 105 assists in enforcement of the GDPR in multiple articles, for example, Article 17 that provides data subjects with the right to erase their data, and Article 15 that provides data subjects with the right to know what information is being collected about them. Apart from retiring the data, the data retirement engine 105 also provides a detailed view of all the data that an organization has on a particular data subject. Instead of a high-level view of all classifications present in a dataset, the data retirement engine 105 provides the flexibility to drill down to a particular subject. The data retirement engine 105 allows organizations who wish to remove data that is past a retention period to comply with audit measures to reduce the footprint of inactive sensitive data.

The data retirement engine 105 retires and deletes sensitive data in a complete and consistent manner to minimize risk involved in storing sensitive data. The sensitive data discovery engine 102 shares discovery results to generate templates as disclosed in the detailed descriptions of FIGS. 2-3 and FIG. 8. The data retirement engine 105 provides security to sensitive data by embedding protections into the data stores. The data retirement engine 105 implements secure tokenization and automated removal of key mapping. The data retirement engine 105 preserves data quality by removing only sensitive operational data and retaining transactional data. The data retirement engine 105 maintains database, application, and transactional integrity. The integration between the sensitive data discovery engine 102 and the data retirement engine 105 ensures the sensitive data pertaining to a requestor is adequately protected. In the soft delete mode, since the sensitive data is not being, deleted, the integrity of the data store remains. For any data that is tokenized, the data retirement engine 105 allows reversal of the data to its original value. The data retirement engine 105 allows reversal for specific records that are required to be reversed. For example, if there are 1000 candidates that have been tokenized as part of a data retirement policy and reversal needs to be performed only on few selected candidates, the data retirement engine 105 implements the reversal process only on the few selected candidates. The tokens generated during tokenization maintain referential integrity. The data retirement engine 105 focusses only on sensitive data columns and does not affect the transactional data, thereby maintaining transactional integrity of the system after the data retirement.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the steps of the method disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. In another embodiment, various aspects of the system and the method disclosed herein are implemented in a non-programmed environment comprising documents created, for example, in a hypertext markup language (HTML), art extensible markup language (XML) or other format that render aspects of a user interface or perform other functions, when viewed in a visual area or a window of a browser program. In another embodiment, various aspects of the system and the method disclosed herein are implemented as programmed elements, or non-programmed elements, or any suitable combination thereof.

Where databases are described such as the data stores 107, 108, 109, 111, etc., exemplarily illustrated in FIG. 1, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers. The embodiments disclosed herein are not limited to a particular computer system platform, processor, operating system, or network.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be executed and changes may be made thereto, without departing from the scope and spirit of the embodiments disclosed herein.

What is claimed is:

1. A system for retiring sensitive data, the system comprising:
   at least one processor;
   a non-transitory, computer-readable storage medium operably and communicatively coupled to the at least one processor and configured to store computer program instructions executable by the at least one processor; and
   a data retirement engine, integrated to and in operable communication with a sensitive data discovery engine, wherein the data retirement engine is configured to define the computer program instructions, which when executed by the at least one processor, cause the at least one processor to:
   receive a sensitive data map generated by the sensitive data discovery engine, and wherein the sensitive data map comprises locations of sensitive data of a plurality of data types in each of a plurality of data stores;
   generate tokens for operational data contained in the sensitive data from the sensitive data map based on selectable data classifications of the operational data using one or more of a plurality of tokenizers configured to desensitize the sensitive data, while retaining transactional data;
   adjustably configure rules for executing tokenization of the operational data based on predetermined criteria;
   determine candidates from the operational data in an entirety of a target data store from one of the plurality of data stores for the tokenization based on the adjustably configured rules;
   tokenize the candidates using the generated tokens on the target data stores; and
   facilitate deletion of the tokens in different modes, and wherein the different modes for the deletion of the tokens comprise a soft delete mode and a hard delete mode, and wherein the soft delete mode is configured to archive a token mapping table that stores mapping information associated with mapping of the candidates to the generated tokens, and wherein the hard delete mode is configured to permanently delete the token mapping table;
   wherein the predetermined criteria for adjustably configuring the rules for executing the tokenization of the operational data comprise one or more of the selectable data classifications and a retirement time period; and
   wherein the data retirement engine is configured to execute the soft delete mode by defining additional computer program instructions, which when executed by the at least one processor, cause the at least one processor to receive a list of the candidates for which the mapping information is to be archived using the adjustably configured rules, transfer the mapping information of the candidates in the received list from the token mapping table to an archive table, and delete the mapping information from the token mapping table; and wherein the data retirement engine is further configured to transfer the archive table to a secure location, from where the archive table is retrievable in response to a request for the reversal of the tokenization, during the soft delete mode, and wherein the data retirement engine is further configured to transfer the mapping information of the candidates in the received list from the archive table to the token mapping table, in response to the request for the reversal of the tokenization, for restoration, during the soft delete mode; and wherein, the data retirement engine is configured to execute the hard delete mode by defining additional computer program instructions, which when executed by the at least one processor, cause the at least one processor to receive a list of the candidates for which the mapping information is to be deleted using the adjustably configured rules and permanently and irreversibly delete the mapping information from the token mapping table.

2. The system of claim 1, wherein the tokenization of the candidates is performed with a token mapping table by implementing at least one of: reversible cryptographic tokenization using an advanced encryption standard, reversible cryptographic tokenization using a secure hash algorithm, and reversible non-cryptographic tokenization.

3. The system of claim 2, wherein the data retirement engine is configured to define additional computer program instructions, which when executed by the at least one processor, cause the at least one processor to encrypt and store a mapping of the candidates and the generated tokens in the token mapping table on a token server, wherein the token mapping table is configured to allow prospective retrieval of inactive sensitive data.

4. The system of claim 1, wherein the tokenization of the candidates is performed without a token mapping table by implementing at least one of: irreversible cryptographic authenticatable tokenization, irreversible cryptographic non-authenticatable tokenization, irreversible non-cryptographic authenticatable tokenization, irreversible non-cryptographic non-authenticatable tokenization, and reversible cryptographic tokenization.

5. The system of claim 1, wherein the data retirement engine is configured to define additional computer program instructions, which when executed by the at least one processor, cause the at least one processor to create entities for grouping and tokenizing the operational data based on the adjustably configured rules.

6. The system of claim 1, wherein the plurality of data stores comprises relational databases, hierarchical databases, server applications, file systems, text, documents, external files, complex data locations, composite data locations, unvalidated fields, binary large objects, character large objects, key value pairs, phantom tables, structured data sources, unstructured data sources, mainframes, cloud data sources, and big data sources.

7. A method for retiring sensitive data, the method comprising steps of:

receiving, by a data retirement engine, a sensitive data map generated by a sensitive data discovery engine, wherein the sensitive data map comprises locations of sensitive data of a plurality of data types in each of a plurality of data stores, and wherein the data retirement engine is integrated to and in operable communication with the sensitive data discovery engine;

generating tokens for operational data contained in the sensitive data from the sensitive data map by the data retirement engine based on selectable data classifications of the operational data using one or more of a plurality of tokenizers configured to desensitize the sensitive data, while retaining transactional data;

adjustably configuring rules for executing tokenization of the operational data by the data retirement engine based on predetermined criteria;

determining candidates from the operational data in an entirety of a target data store from one of the plurality of data stores for the tokenization by the data retirement engine based on the adjustably configured rules;

tokenizing the candidates by the data retirement engine using the generated tokens on the target data stores; and facilitating deletion of the tokens in different modes by the data retirement engine;

wherein the predetermined criteria for adjustably configuring the rules for executing the tokenization of the operational data comprise one or more of the selectable data classifications and a retirement tune period, wherein the different modes for the deletion of the tokens comprise a soft delete mode and a hard delete mode, and wherein the soft delete mode is configured to archive a token mapping table that stores mapping information associated with mapping of the candidates to the generated tokens, and wherein the hard delete mode is configured to permanently delete the token mapping table; and wherein the steps of executing the soft delete mode comprises:

receiving a list of the candidates for which the mapping information is to be archived using the adjustably configured rules by the data retirement engine; and transferring the mapping information of the candidates in the received list from the token mapping table to an archive table by the data retirement engine, wherein the mapping information is deleted from the token mapping table;

transferring the archive table to a secure location by the data retirement engine, from where the archive table is retrievable in response to a request for the reversal of the tokenization; and transferring the mapping information of the candidates in the received list from the archive table to the token mapping table by the data retirement engine for restoration, in response to the request for the reversal of the tokenization; and wherein the step of executing the hard delete mode comprises:

receiving a list of the candidates for which the mapping information is to be deleted by the data retirement engine using the adjustably configured rules; and permanently and irreversibly deleting the mapping information from the token mapping table by the data retirement engine.

8. The method of claim 7, wherein the tokenization of the candidates is performed with a token mapping table by implementing at least one of: reversible cryptographic tokenization using an advanced encryption standard, reversible cryptographic tokenization using a secure hash algorithm, and reversible non-cryptographic tokenization.

9. The method of claim 8, further comprising encrypting and storing a mapping of the candidates and the generated tokens in the token mapping table on a token server, by the data retirement engine, wherein the token mapping table is configured to allow prospective retrieval of inactive sensitive data.

10. The method of claim 7, wherein the tokenization of the candidates is performed without a token mapping table by implementing at least one of irreversible cryptographic authenticatable tokenization, irreversible cryptographic non-authenticatable tokenization, irreversible non-cryptographic authenticatable tokenization, irreversible non-cryptographic non-authenticatable tokenization, and reversible cryptographic tokenization.

11. The method of claim 7, further comprising creating entities for grouping and tokenizing the operational data by the data retirement engine based on the adjustably configured rules.

12. The method of claim 7, wherein the plurality of data stores comprises relational databases, hierarchical databases, server applications, file systems, text, documents, external files, complex data locations, composite data locations, unvalidated fields, binary large objects, character large objects, key value pairs, phantom tables, structured data sources, unstructured data sources, mainframes, cloud data sources, and big data sources.

* * * * *